(12) United States Patent
Shen et al.

(10) Patent No.: US 7,986,730 B1
(45) Date of Patent: Jul. 26, 2011

(54) METHODS AND APPARATUS FOR UPDATING A REDUCTION RATIO

(75) Inventors: Ke Shen, Sunnyvale, CA (US); Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1499 days.

(21) Appl. No.: 11/407,010

(22) Filed: Apr. 18, 2006

Related U.S. Application Data

(63) Continuation of application No. 09/867,967, filed on May 29, 2001, now Pat. No. 7,054,362.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................... 375/240.02

(58) Field of Classification Search ............ None
See application file for complete search history.

(56) References Cited

U.S. PATENT DOCUMENTS

| | | | |
|---|---|---|---|
| 5,005,076 A | 4/1991 | Stroppina et al. | |
| 5,473,380 A * | 12/1995 | Tahara ................ | 375/240.23 |
| 5,473,599 A | 12/1995 | Cole et al. | |
| 5,715,009 A * | 2/1998 | Tahara et al. ........ | 375/240.23 |
| 5,907,374 A | 5/1999 | Liu | |
| 6,002,801 A | 12/1999 | Strongin et al. | |
| 6,141,358 A | 10/2000 | Hurst, Jr. et al. | |
| 6,181,711 B1 | 1/2001 | Zhang et al. | |
| 6,236,749 B1 | 5/2001 | Satonaka et al. | |
| 6,263,021 B1 | 7/2001 | Sethuraman et al. | |
| 6,335,990 B1 | 1/2002 | Chen et al. | |
| 6,359,999 B1 | 3/2002 | Moriwaki et al. | |
| 6,412,112 B1 | 6/2002 | Barrett et al. | |
| 6,442,207 B1 | 8/2002 | Nishikawa et al. | |
| 6,516,096 B2 | 2/2003 | Yokose et al. | |
| 6,535,556 B1 | 3/2003 | Kato et al. | |
| 6,553,148 B2 | 4/2003 | Zeng et al. | |
| 6,556,624 B1 | 4/2003 | Orchard et al. | |
| 6,621,866 B1 * | 9/2003 | Florencio et al. ........ | 375/240.25 |
| 6,661,923 B1 | 12/2003 | Koike et al. | |
| 6,665,346 B1 | 12/2003 | Lee et al. | |
| 6,671,322 B2 | 12/2003 | Vetro et al. | |
| 6,687,296 B1 | 2/2004 | Sato et al. | |
| 6,763,067 B2 | 7/2004 | Hurst | |
| 6,763,070 B1 | 7/2004 | Lee | |

(Continued)

OTHER PUBLICATIONS

G. Keesman, R. Hellinghuizen, F. Hoeksema, G. Heideman, "Transcoding of MPEG bitstreams", Signal Processing: Image Communication, vol. 8 (1996), pp. 481-500.

(Continued)

*Primary Examiner* — Nhon T Diep
(74) *Attorney, Agent, or Firm* — Weaver Austin Villeneuve & Sampson LLP

(57) ABSTRACT

According to the present invention, methods and apparatus for updating reduction ratios are provided. An input bit sequence can be altered to provide modified output bit sequence. The input bit sequence may represent information in a portion of data such as a video sequence, a picture, or an audio stream. In one example, the bit sequence is an MPEG-2 video sequence. The input bit sequence is altered using a reduction ratio to provide a modified output bit sequence. The reduction ratio can be continually updated using rate control information to achieve a target reduction ratio for the input bit sequence.

40 Claims, 14 Drawing Sheets

U.S. PATENT DOCUMENTS 6,847,656 B1 * 1/2005 Wu et al. .................. 370/477
7,321,622 B2 * 1/2008 Etoh et al. .................. 375/240

OTHER PUBLICATIONS

Brian C. Smith, "A Survey of Compressed Domain Processing Techniques," downloaded from www.uky.edu, Mar. 20, 2001, 10 pages.

Anthony Vero, "MPEG-4 Rate Control for Multiple Video Objects," *IEEE Transactions on Circuits and Systems for Video Technology*, vol. 9, No. 1, Feb. 1999, pp. 186-199.

Wu et al., "Methods and Apparatus for Transform Coefficient Filtering," U.S. Appl. No. 09/867,966, filed May 29, 2001, 40 pages.

U.S. Office Action mailed Dec. 21, 2004, from U.S. Appl. No. 09/867,966.

U.S. Office Action mailed Aug. 9, 2005, from related U.S. Appl. No. 09/867,966.

U.S. Appl. No. 09/608,128, filed Jun. 30, 2000.

U.S. Appl. No. 09/766,020, filed Jan. 18, 2001.

\* cited by examiner

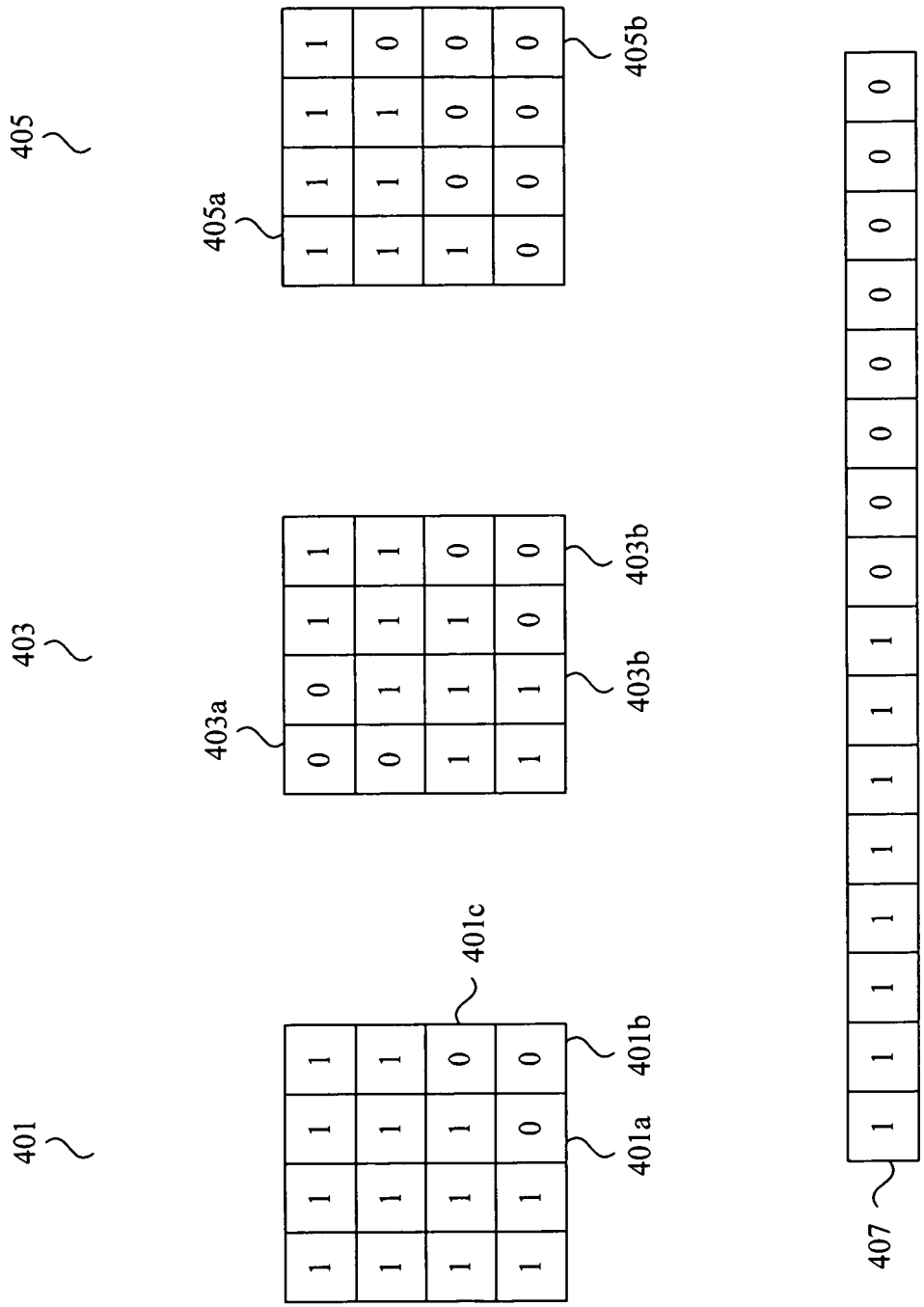

METHODS AND APPARATUS FOR UPDATING A REDUCTION RATIO

CROSS REFERENCE TO RELATED APPLICATIONS

This patent application is a continuation of prior application Ser. No. 09/867,967, "METHODS AND APPARATUS FOR UPDATING A REDUCTION RATIO," filed May 29, 2001, now U.S. Pat. No. 7,054,362 from which priority under 35 U.S.C. §120 is claimed. The above-referenced patent application is incorporated herein by reference in its entirety and for all purposes.

The present application is related to U.S. patent application Ser. No. 09/867,966, filed May 29, 2001 by Wu et al., and titled Methods and Apparatus for Transform Coefficient Filtering and U.S. patent application Ser. No. 09/870,177, filed May 29, 2001, now U.S. Pat. No. 6,763,070, by Lee et al., and titled Methods and Apparatus for Selecting a Cut-off Index, both filed on the same day as the present application. Each of the above patent applications is incorporated herein by reference for all purposes.

BACKGROUND OF THE INVENTION

The present invention relates to rescaling data. More specifically, the present invention relates to updating reduction ratios used for rescaling data sequences. Still more specifically, the present invention provides techniques for determining reduction ratios for modifying transform coefficients associated with an input data sequence (e.g. an audio segment or a video sequence) to provide modified transform coefficients associated with a modified output data sequence.

Video data is one particularly relevant form of data that can benefit from improved techniques for rescaling. Generally, compressing data or further compressing compressed data is referred to herein as rescaling data. Video rescaling schemes allow digitized video frames to be represented digitally in an efficient manner. Rescaling digital video makes it practical to transmit the compressed signal by digital channels at a fraction of the bandwidth required to transmit the original signal without compression. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/subband transforms), quantization of the transform coefficients, and variable length coding (VLC).

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to rescaling is variable length coding (VLC) that represents frequently used symbols using code words. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Intracoded frames, such as B-frames or P-frames in MPEG-2, store motion vectors associated with the movement of particular objects. The pixel-wise difference between objects is called the error term, which can be stored in P-frames and B-frames. In MPEG-2, P-frames reference a single frame while B-frames reference two different frames. Although this allows fairly high reduction ratios, motion compensation is limited when significant changes occur between frames. This precludes high reduction ratios. Furthermore, motion compensation can be computationally expensive.

Each frame can be converted to luminance and chrominance components. As will be appreciated by one of skill in the art, the human eye is more sensitive to the luminance than to the chrominance of an image. In MPEG-2, luminance and chrominance frames are divided into 8×8 pixel blocks. The 8×8 pixel blocks are transformed using a discrete cosine transform (DCT) and scanned to create a DCT coefficient vector. Quantization involves dividing the DCT coefficients by a scaling factor. The divided coefficients can be rounded to the nearest integer. After quantization, some of the quantized elements become zero. The many levels represented by the transform coefficients are reduced to a smaller number of levels after quantization. With fewer levels represented, more sequences of numbers are similar. For example, the sequence 4.9 4.1 2.2 1.9 after division by two and rounding becomes 2 2 1 1. As will be described below, a sequence with more similar numbers can more easily be encoded using VLC encoding. However, quantization is an irreversible process and hence introduces significant loss of information associated with the original frame or image.

VLC encoding takes the most common long sequences of numbers of bits and replaces them with a shorter sequence of numbers or bits. Again, VLC encoding is limited by common sequences of numbers or bits. Data containing fewer common sequences take more bits to encode.

Currently available compression techniques for resealing data (e.g. video or audio) are limited in their ability to effectively compress data sequences for transmission across networks or storage on computer readable media. The available techniques also have significant limitations with respect to loss, computational expense, and delay. Various techniques for reducing the bit rate of compressed data sequences including audio and video streams are being developed. Some of the more promising approaches are described in U.S. Pat. No. 6,181,711 titled System And Method For Transporting A Compressed Video And Data Bitstream Over A Communication Channel. Other approaches are described in U.S. patent application Ser. No. 09/608,128 Methods And Apparatus For Bandwidth Scalable Transmission Of Compressed Video Data Through Resolution Conversion and U.S. patent application Ser. No. 09/766,020 titled Methods For Efficient Bandwidth and U.S. patent application Ser. No. 08/985,377 titled System And Method For Spatial Temporal-Filtering For Improving Compressed Digital Video Scaling Of Compressed Video Data. Each of these references is assigned to the assignee of this invention and is incorporated herein by reference for all purposes. It is still desirable to provide additional techniques for rescaling data that improve upon the limitations of the prior art.

SUMMARY OF THE INVENTION

According to the present invention, methods and apparatus for updating reduction ratios are provided. An input bit sequence can be altered to provide modified output bit sequence. The input bit sequence may represent information in a portion of data such as a video sequence, a picture, or an audio stream. In one example, the bit sequence is an MPEG-2 video sequence. The input bit sequence is altered using a reduction ratio to provide a modified output bit sequence. The reduction ratio can be continually updated using rate control information to achieve a target reduction ratio for the input bit sequence.

One aspect of the invention provides a method of altering blocks of transform coefficients associated with input bits to provide modified blocks of transform coefficients associated with output bits. A first block of transform coefficients associated with the input bits is identified. The first block of transform coefficients is altered by using a reduction ratio to generate a first block of modified transform coefficients. An updated reduction ratio is generated. A second block of transform coefficients associated with the input bits is identified. The second block of transform coefficients is altered to generate a second block of modified transform coefficients using the updated reduction ratio.

The first block of transform coefficients may be identified by performing variable length decoding on the input bits, acquiring the transform coefficients from a file, performing a DCT operation on video data, or performing a DCT operation on audio data.

Another aspect of the invention provides a method for altering transform coefficients associated with macroblocks in a frame having a frame size and a target reduction ratio. A number of input bits and a number of output bits associated with a set of processed macroblocks is identified. The processed macroblocks have altered transform coefficients. An updated reduction ratio using the number of input bits and the number of output bits associated with the set of processed macroblocks is generated. Transform coefficients of a next macroblock using the updated reduction ratio are altered.

Calculation of the updated reduction ratio can comprise using a spreading factor, a compensation factor, and a convergence factor.

Yet another aspect of the invention provides an apparatus for altering transform coefficients associated with macroblocks in a frame having a frame size and a target reduction ratio. The apparatus comprises several components. A feedback stage is configured to identify a number of input bits and a number of output bits associated with a set of processed macroblocks, the processed macroblocks having altered transform coefficients. The feedback stage is further configured to generate an updated reduction ratio using rate control information. A filtering stage is coupled to the feedback stage and configured to alter transform coefficients of a next macroblock using the updated reduction ratio.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

FIG. 4 is a diagrammatic representation of filters using zeros and ones, according to specific embodiments.

DETAILED DESCRIPTION OF SPECIFIC EMBODIMENTS

The present invention generally relates to data compression. Data compression techniques are described generally in *The Data Compression Book*, by Mark Nelson (ISBN: 1558514341), the entirety of which is hereby incorporated by reference for all purposes.

Many techniques for data compression are currently available. One particularly relevant technique for data compression is MPEG-2. MPEG-2 uses motion compensation, discrete cosine transforms, quantization, and variable length coding to rescale video data. Many prior art techniques have focused bit rate reduction and rescaling schemes on quantization, motion compensation, and variable length encoding. The present invention provides techniques for selectively filtering DCT coefficients to efficiently allow video compression to comply with desired reduction ratios while maintaining optimal perceivable image quality. More specifically, the present invention allows selective filtering of DCT coefficients associated with a macroblock to comply with reduction ratios by using rate control information derived from compression filtering and encoding of prior macroblocks.

Figure 1:
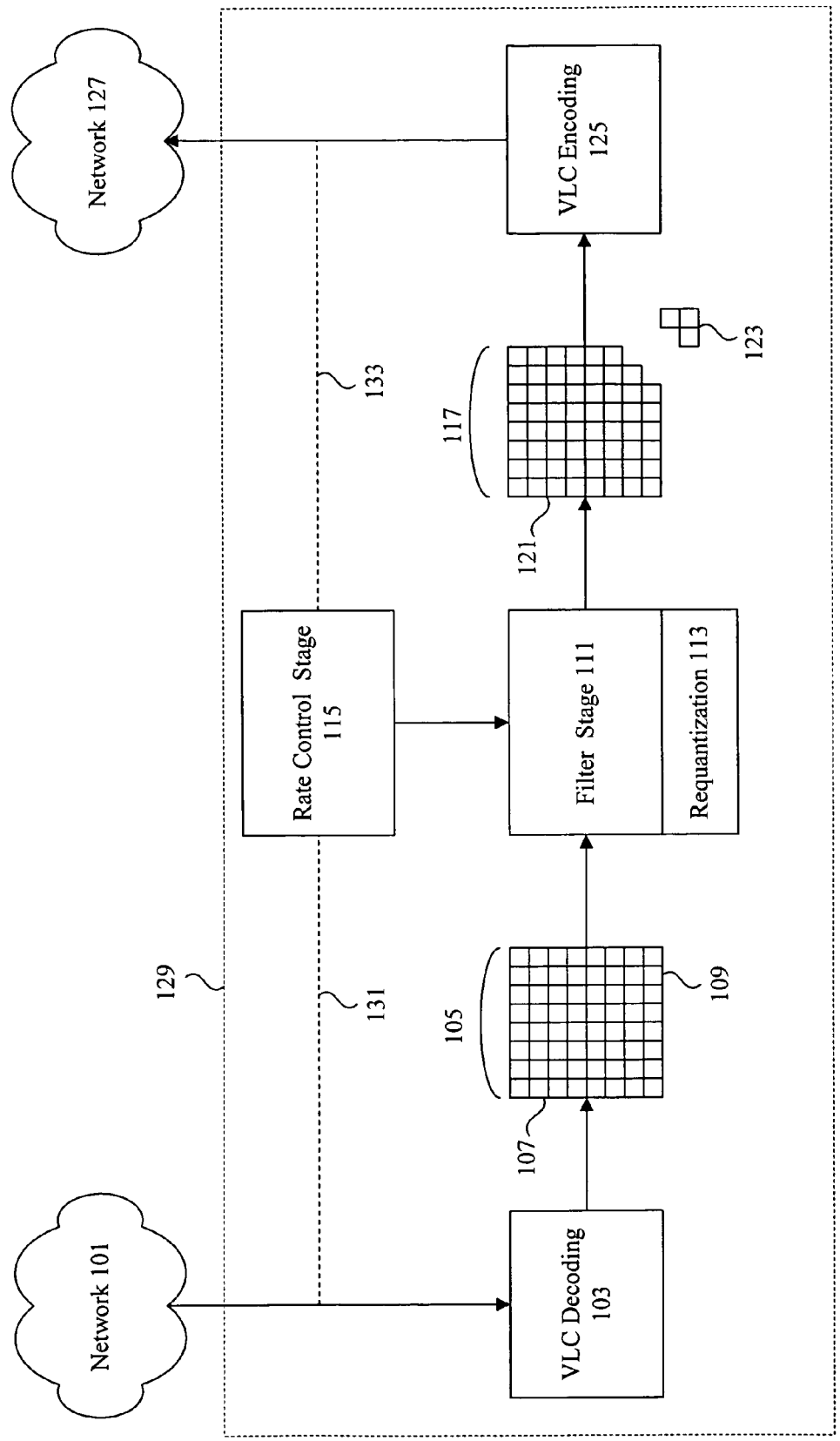
FIG. 1 is diagrammatic representation of a system that can use the techniques of the present invention, according to specific embodiments.

FIG. 1 is a diagrammatic representation of a system 129 that can use the techniques of the present invention. FIG. 1 shows a system 129 that couples network 101 and network 127. According to various embodiments, network 101 has one set of constraints while network 127 has a more restrictive set of constraints. For example, network 101 may allow transmission at a higher bit rate than network 127. A system 129 receiving encoded content can reduce or rescale the content to allow transmission onto network 127. In one example, the bandwidth allocated on a network 101 to a particular user is 1

MBps while the bandwidth allocated for transmission on network 127 for the same user is 0.8 MBps. A real-time video stream transmitted from one network to another may benefit from improved techniques for rescaling the video stream to comply with the more restrictive constrains of network 127.

In common embodiments, system 129 can be part of a network device such as a gateway, router, switch, or cable network headend equipment connecting two different networks or networks having different network constraints. According to various embodiments, the encoded content is an MPEG bitstream. Note that the invention is not limited to an application to MPEG compression, or even the video compression techniques generally. Rather the invention is applicable to any type of content in which transform coefficients are used to represent portions of content. Furthermore, the coefficients can be selected based upon the type of untransformed content they represent (e.g. high frequency vs. low-frequency spatial features of an image or an audio sample).

For convenience, the invention will be described in the context of MPEG-2 compression and bit rate reduction in an MPEG-2 video stream. The size of an MPEG bitstream can be reduced by filtering the transform coefficients in each MPEG frame. A system 129 can then apply a reduction ratio of 0.8 to the encoded content by filtering coefficients. The output bitrate divided by the input bitrate is herein referred to as a reduction ratio. It should be noted that filtering includes altering coefficients, zeroing coefficients, setting a coefficient string to a particular sequence, or generally changing transform coefficients in block to allow an effective rescaling ratio. As will be appreciated by one of skill in the art, the bitstream is partially decoded before the transform coefficients are altered or filtered. The techniques of the present invention allow rescaling of a data sequence without complete decoding of the data sequence. According to various embodiments, rescaling the video stream does not involve computationally expensive inverse transform operations. Variable length decoding stage 103 receives the MPEG encoded bitstream and applies variable length decoding to extract a block 105. Block 105 typically represents a portion of a frame of MPEG video.

As will be appreciated by one of skill in the art, the basic structure for a coded video frame or picture is a block that is an 8 pixel by 8 pixel array. Multiple blocks form a macroblock, which in turn form part of a slice. In one embodiment, a block is a macroblock. A coded frame consists of multiple slices. Multiple coded frames form a group of frames. Such hierarchical layering of data structures localizes the most basic processing on the lowest layer, namely blocks and macroblocks.

As noted above, each block contains variable length codes for DCT coefficients. In the MPEG-2 syntax, the picture data section contains the bulk of the compressed video images. This is where the DCT coefficients are encoded as variable length codes. For a typical bitstream, this portion of the data takes somewhere between 70%-90% of the total bit usage of a coded picture, depending on the coded bit rate.

The access unit level information relates to coded pictures and may specify whether a picture is an intra frame (I-frame), a predicted frame (P-frame), or a bi-directional frame (B-frame). An I-frame contains full picture information. A P-frame is constructed using a past I-frame or P-frame. A bi-directional frame (B-frame) is bi-directionally constructed using both a past and a future I-frame or P-frame. I-frames can be referred to as anchor frames.

Each video frame can be represented by luminance and chrominance pixels. The techniques of the present invention apply regardless of the type of frame or the type of pixel.

Block 105 contains transform coefficients that roughly correspond to frequency information contained in the video block. Block 105 has low-frequency transform coefficients 107 and higher frequency transform coefficients 109. Although the transform coefficients in block 105 do not correspond exactly to frequency information contained in a portion of the frame of MPEG video, the coefficients provide general information on the various types of frequency information in the portion of the frame. Block 105 is passed to a filtering stage 111. Filtering stage 111 is optionally coupled with requantization stage 113. Both filtering at filtering stage 111 and requantization at requantization stage 113 can be used to reduce the bandwidth requirements of the MPEG encoded bitstream. Filtering stage 111 can be used to selectively filter transform coefficients.

According to various embodiments, filtering transform coefficients can comprise zeroing the transform coefficients or setting the transform coefficients to a particular sequence of numbers. In FIG. 1, transform coefficients 123 of block 117 are selected for filtering. Block 117 of modified transform coefficients comprises lower frequency transform coefficients 121 and higher frequency transform coefficients 123. Often frequency can be used as a filtering criteria for the coefficients. Of course, other criteria such as computational convenience, etc. can be used to select coefficients for filtering. Various selection and filtering criteria will be described further below.

Certain embodiments of the present invention select the higher frequency components 123 of the modified transform coefficient block 117 for filtering. Of course there may be other frequency selection criteria that can be used. Requantization stage 113 can also be used to zero transform coefficients 117 or to reduce the number of levels represented by a block 117. As will be appreciated by one of skill in the art, a block of modified transform coefficients 117 containing fewer levels and more zeroes can be efficiently variable length coded at VLC recoding stage 125. The modified transform coefficient block 117 can be encoded as a reduced output bitstream. The output bitstream can be provided to network 127.

Rate control stage 115 monitors the number of input bytes and the number of output bytes along lines 131 and 133 respectively. Rate control stage 115 can use information about the number of input and output bytes for prior filtered blocks of data to provide rate control information for a current block. Rate control information can be provided to filtering stage 111 and to requantization stage 113 to allow control over resealing. Information provided by rate control stage 115 can be used by filtering stage 111 and requantization stage 113 to determine specifically how transform coefficients will be altered. According to various embodiments rate control information is provided by rate control stage 115 for each macroblock.

As will be appreciated by one of skill in the art, each macroblock can comprise multiple component blocks. In MPEG-2, various formats may be employed to define the luminance and chrominance pixel content at a macroblock. Using the 4:2:0 format, a macroblock comprises four 8×8 matrices of luminance coefficients and two 8×8 matrix of chrominance coefficients. Rate control information can be updated at rate control stage 115 after a macroblock has been processed. Of course, other formats can use the techniques of the present invention. Alternatively, rate control stage 115 may provide rate control information to filtering stage 111 and requantization stage 113 on a per frame or a per block basis.

Although that techniques of the present invention can be used in a network node connecting two networks having different bandwidth constraints, the techniques of the present invention are more general and can be applied in a variety of different contexts. For example, instead of receiving an MPEG encoded bitstream from a network 101, the MPEG encoded bitstream may be contained in a file that can be reduced in size prior to either storage, viewing, or transmission. System 127 can be used to reduce the size of a transform encoded file saved on a hard disk, CD, DVD, or other media. An MPEG encoded file can be variable length decoded at variable length decoding stage 103. A block 105 is forwarded to filtering stage 111 and/or requantization stage 113 to provide a modified block 117.

According to various embodiments, a block of altered transform coefficients is then recoded at VLC encoding stage 125 and provided to output. A rate control stage 115 can provide rate control information to filtering stage 111 and requantization stage 113 based on the desired file reduction size. Information can be provided to filtering stage 111 and requantization stage 113 to allow a determination of how transform coefficients are altered or filtered. As noted above, rate control information can be provided for filtering on a per macroblock basis. In accordance with the techniques of the present invention, the inverse transform coding may be performed in a manner designed to meet a reduction ratio.

Figure 2:
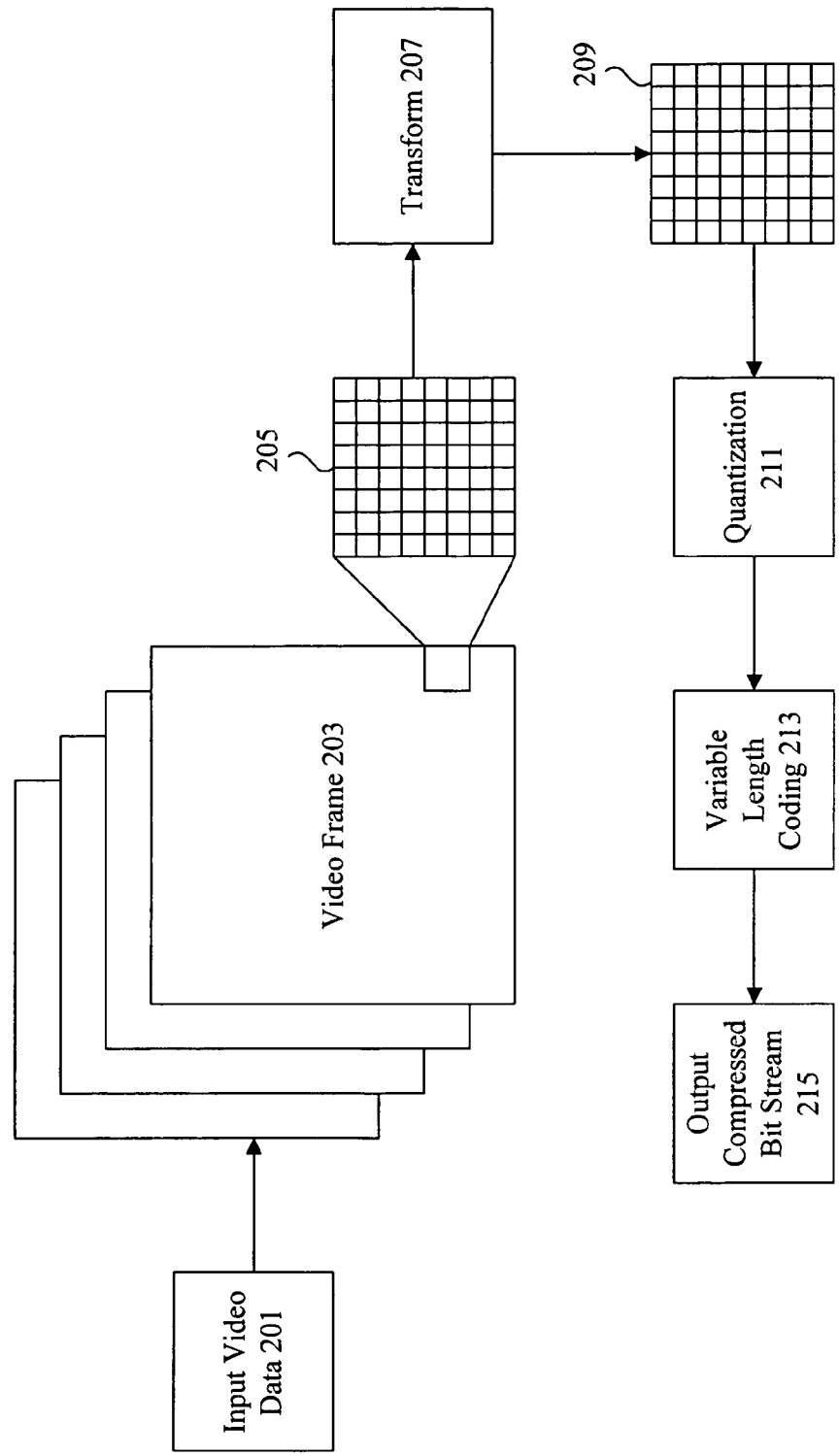
FIG. 2 is a diagrammatic representation of another system that can use the techniques of the present invention, according to specific embodiments.

FIG. 2 is a diagrammatic representation of a another system that can use the techniques of the present invention. FIG. 2 describes a system for using the techniques of the present invention to initially encode video content. Video data 201 is split into video frames 203. Each video frame 203 can be uncompressed data. Although FIG. 2 is described in the context of video data, one of skill in the art will understand that the techniques of the present invention can be applied to other types of data such as simple image data (e.g. JPEG) or audio data. Each video frame 203 can be divided into 16×16 pixel macroblocks. The macroblocks are further separated into component blocks of pixels.

Block 205 can represent 64 pixels of image data. A transform stage 207 is applied to the block 205. According to specific embodiments, the transform stage 207 is a discrete cosine transform (DCT). The transform stage converts block 205 representing pixel information to block 209 containing DCT coefficients. The transform coefficient block 209 can then be quantized at quantization stage 211. Using the techniques of the present invention, filtering stage 217 contains mechanisms for selectively filtering DCT coefficients. The filtering stage 217, can contain mechanisms for selecting how and how many DCT coefficients to filter in order to obtain desired rescaling ratios. According to various embodiments, the coefficient filtering occurs for various intrablocks.

As will be appreciated by one of skill in the art, the coefficients in the top left region of block 209 roughly correspond to low frequency components of block 205. The coefficients in the bottom right region of block 209 roughly correspond to high frequency components of block 205. The human eye is typically more sensitive to low frequency components than to high frequency components of an image. By removing low frequency components of an image, the edges and corners become more abrupt. By removing high frequency components of an image, the edges and corners tend to blur. By selectively filtering DCT coefficients of block 209, an image can be minimally altered while falling within bounds of a reduction ratio. The techniques of the present invention allow DCT coefficients to be selectively filtered in order to comply with reduction ratios.

The techniques of the present invention allow filtering stage 207 to dynamically vary the number of DCT coefficients dropped based on the varying requirements of macroblock sequences. For example, a few macroblocks of a particular video frame may be particularly easy to compress. This may be due to the fact that the first few macroblocks contain mostly smooth areas. Quantization stage 211 and variable length and coding 213 are able to compact the information associated with the first he macroblocks into a small number of output bits in output bitstream 215. The target reduction ratio may seem easily achievable based on the first few macroblocks.

The filtering stage 217 can selectively filter fewer DCT coefficients. However, if the compression of prior macroblocks indicates that the total reduction ratio has not been achieved, filtering stage 217 can filter more DCT coefficients. Filtering more DCT coefficients tends to decrease the number of bits in the output compressed bitstream 215.

As noted above, the DCT coefficients correspond to limited ranges of frequency information for the block 205. Often frequency can be used as a filtering criteria for the coefficients. Of course, other criteria such as computational convenience can be used to select coefficients based upon their contribution on human perception. As noted, the human eye is more sensitive to degradation of low-frequency spatial information than the degradation of higher frequency spatial information. Therefore, certain embodiments of this invention select the high frequency components of coefficient matrices for dropping. Of course there may be other frequency regimes that could be selected. In one embodiment, a system/method of this invention select particular frequency bands for filtering. Alternatively, for applications in edge and line detection, low-frequency components can be selected for filtering.

The results from filtering stage 217 are variable length coded using VLC encoding at 213. The output compressed bitstream is provided at 215.

Although the techniques of the present invention can be used in conjunction with all of the techniques described in FIG. 2, it should be noted that not all the techniques of FIG. 2 need to be used. For example, using the techniques of the present invention for selectively filtering DCT coefficients can allow quantization stage 211 to be avoided. Avoiding quantization can prevent irrecoverable loss of image information.

Figure 3A:
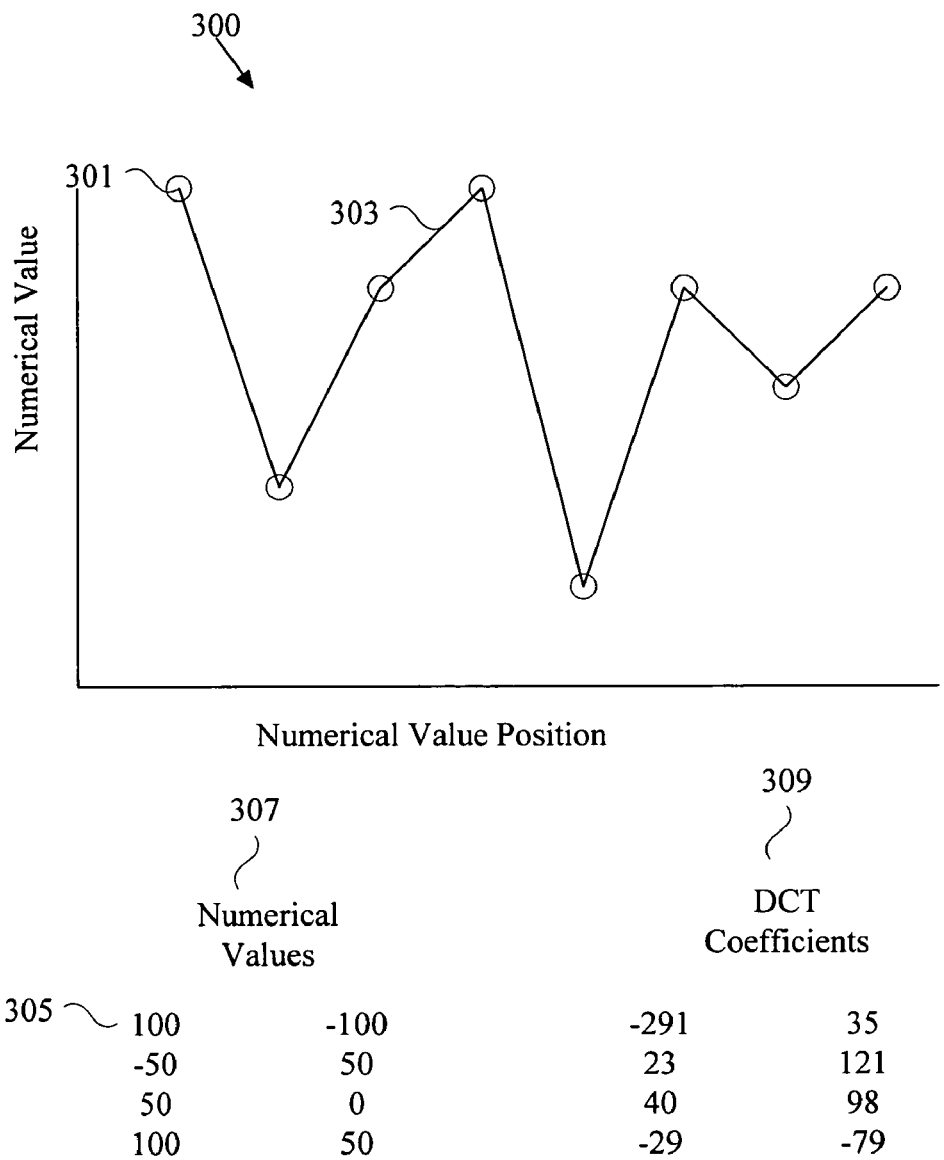
FIGS. 3A and 3B are graphical representations of numbers, the DCT coefficients associated with the numbers, and the IDCT of the DCT coefficients, according to specific embodiments.
Figure 3B:
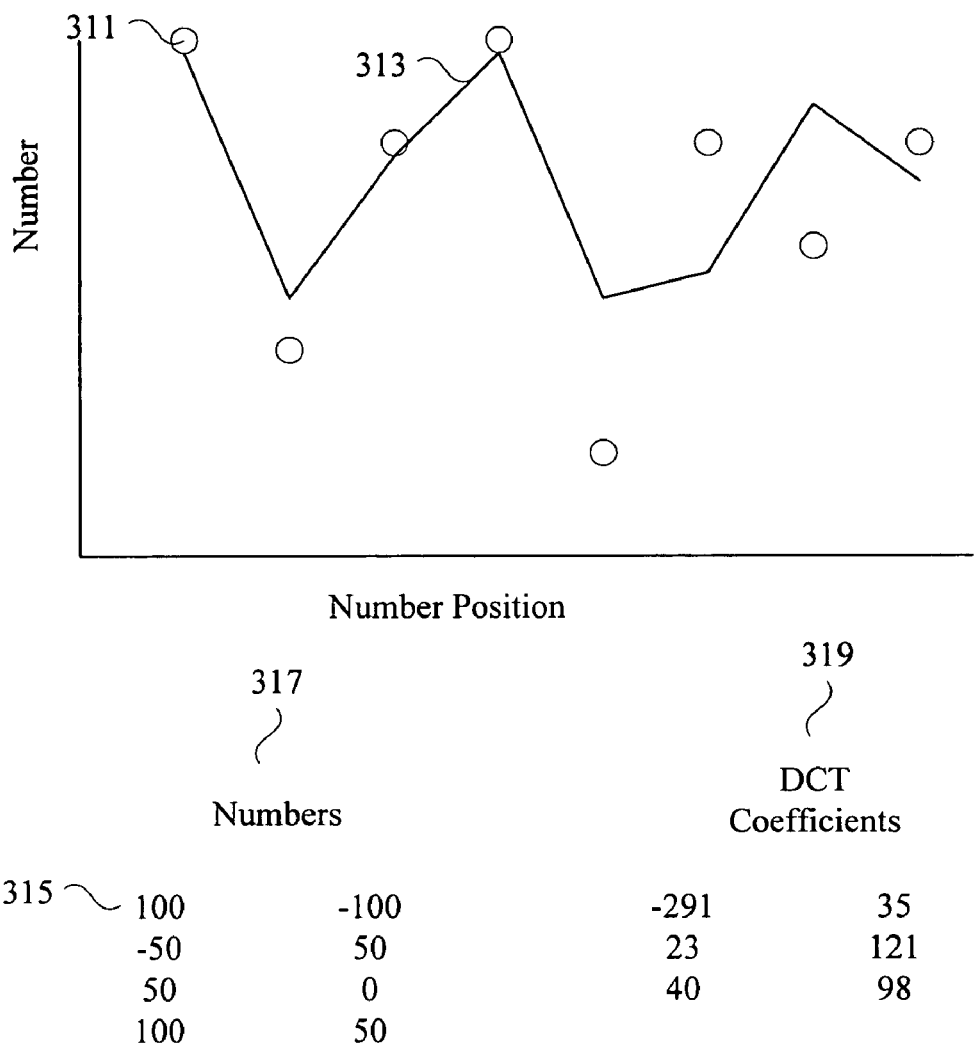

FIGS. 3A and 3B are graphical representations of information loss when DCT coefficients are selectively filtered. In FIG. 3A, numerical values 307 are represented in graph 300. The values may be pixel luminance values, for example. Numerical value 301 in the graph corresponds to numerical value 305 in the list. The DCT coefficients for numerical values 307 are DCT coefficients 309. The eight numbers shown in graph 300 are transformed into the eight DCT coefficients 309. Taking an inverse discrete cosine transform (IDCT) using the eight DCT coefficients 309 produces curve 303 in graph 300. It should be noted that all the information associated with numbers 307 is maintained. By using all the DCT coefficients, line 303 corresponds exactly with numbers 307 in graph 300.

In FIG. 3B, a DCT transform is applied to numerical values 317 to produce DCT coefficients. However, two high frequency DCT coefficients are filtered to yield DCT coefficients 319. As noted above, DCT coefficients can be filtered in order to comply with desired reduction ratios. Taking the IDCT using the six DCT coefficients 319 yields curve 313. It should be noted that the curve 313 does not correspond exactly with numerical values 317. Curve 313 somewhat approximates the original numbers 317. Accordingly, it is typically desirable to filter or alter as few DCT coefficients as possible.

Generally, the number of coefficients designated for filtering is referred to herein as the cut-off index. However, a cut-off index can be defined in many ways, such as a position index separating coefficients associated with a pass band and coefficients associated with a stop band. As will be appreciated by one of skill in the art, DCT coefficients roughly correspond to frequency components of a particular data sequence. The cut-off index can also be referenced as a cut-off frequency. That is, frequency components above or below a certain cut-off frequency may be selectively filtered. According to other embodiments multiple cut-off indices can be used. The DCT coefficients between two cut-off indices can be filtered. In the same way, DCT coefficients between several cut-off frequencies can be filtered. Multiple cut-off indices and cut-off frequencies can allow filtering of DCT coefficients that have the least perceivable effect on the original data sequence. Most fundamentally, a cut-off index represents a quantity of data that must be removed to meet some bandwidth or storage requirements.

FIG. 4 is a diagrammatic representation of filters that can be used to selectively drop transform coefficients according to the techniques of the present invention. Filters of different strengths can be predetermined and stored. It should be noted that typically filters for MPEG-2 encoded blocks will be 8×8 blocks. However, for ease of discussion, the blocks shown in FIG. 4 are 4×4 blocks. The filter parameters can be as simple as an array of zeros and ones, where a one indicates coefficients associated with a pass band and a zero indicates coefficients associated with a stop band. A transform coefficient from a block corresponding to a one in the filter block will be retained, while a transform coefficient corresponding to zero in the filter block will be dropped. Filter 401 illustrates a filter that selects three coefficients 401a, 401b, and 401c for dropping. The other values in the filter are ones indicating pass band. It should be noted that filter 401 provides one way of implementing a cut-off index of 13.

Filter 403 illustrates an implementation of a pass band filter. Filter 403 contains ones in the pass band 403b that allow mid-frequency transform coefficients in a block to be retained. Low frequency band 403a and high frequency band 403c contain zeros that filter high and low frequency transform coefficients in a block.

Filter 405 is a filter that is configured to drop half the coefficients associated with higher frequency components at a block. Ones are placed in portion 405a representing lower frequency components while zeroes are placed in portion 405b representing higher frequency components. Filter 405 applied to a block of transform coefficients retains only the 8 lower frequency coefficients of the transform block.

It should be noted that although the filter is represented as a two-dimensional block, the filter can just as easily be represented as a one-dimensional array. Filter 407 is one representation of filter 405 using a one-dimensional array of ones and zeroes.

Figure 5:
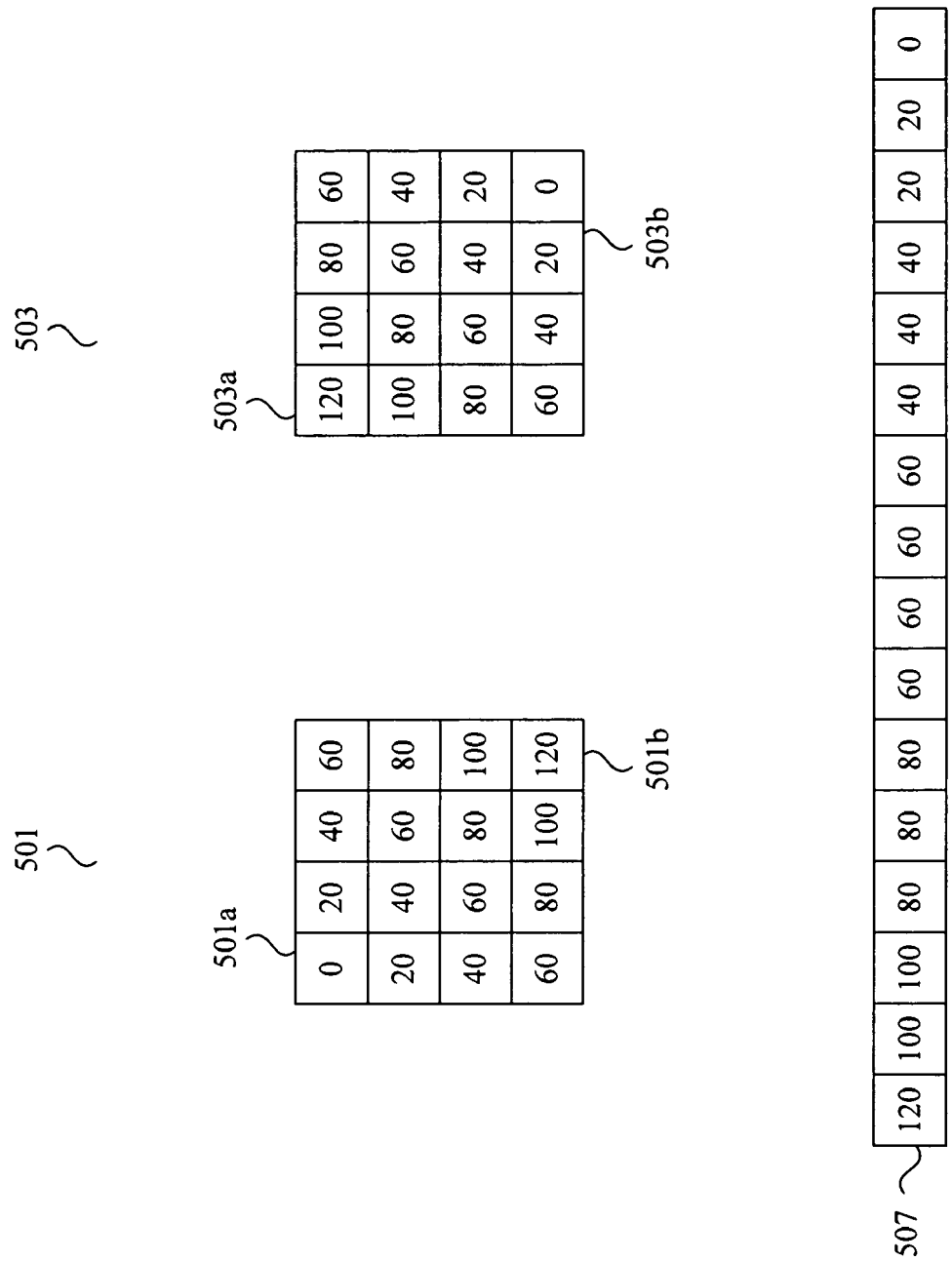
FIG. 5 is a diagrammatic representation of filters using threshold values, according to specific embodiments.

Instead of using one to zeroes, thresholds can be used to determine whether a particular coefficient in a transform block should be dropped. FIG. 5 is a diagrammatic representation of filter blocks using thresholds for determining whether transform coefficients should be filtered according to various embodiments. As will be appreciated by one of skill in the art, transform coefficients in a block roughly correspond to frequency information of a portion of video or audio and can have different values. Larger values tend to indicate transform coefficients of greater importance. According to various embodiments, if the transform coefficient of a block exceeds the corresponding value in a filter, the transform coefficient is retained.

Filter 501 provides one example of a filter using threshold values. Filter 501 has lower values in portion corresponding to low-frequency coefficients and higher values corresponding to high frequency coefficients. That is, applying filter 501 to a transform coefficient block would retain most of the low-frequency coefficients because most of the lower frequency coefficients would be higher than the small values in portion 501a. Portion 501b in filter 501 contains higher values. Transform coefficients of a block would only be retained if they had a magnitude greater than the corresponding value in the filter 501. That is, high frequency coefficients in a block would only be retained if they had sufficient magnitude to exceed the higher values contained in portion 501b.

Filter 503 is another embodiment of a filter that can be used to filter transform coefficients. Filter 503 has high threshold values in portion 503a. A transform coefficient block applying filter 503 would have many low-frequency coefficients removed since many low-frequency coefficients do not exceed the threshold values in portion 503a. A Filter using threshold values can also be implemented as a one-dimensional array as shown in filter 505.

It should be noted that a variety of filters including low pass, high pass, notch, comb, and band pass filters can be implemented with the filters using ones and zeroes shown in FIG. 4, or filters using threshold values shown in FIG. 5.

Figure 6:
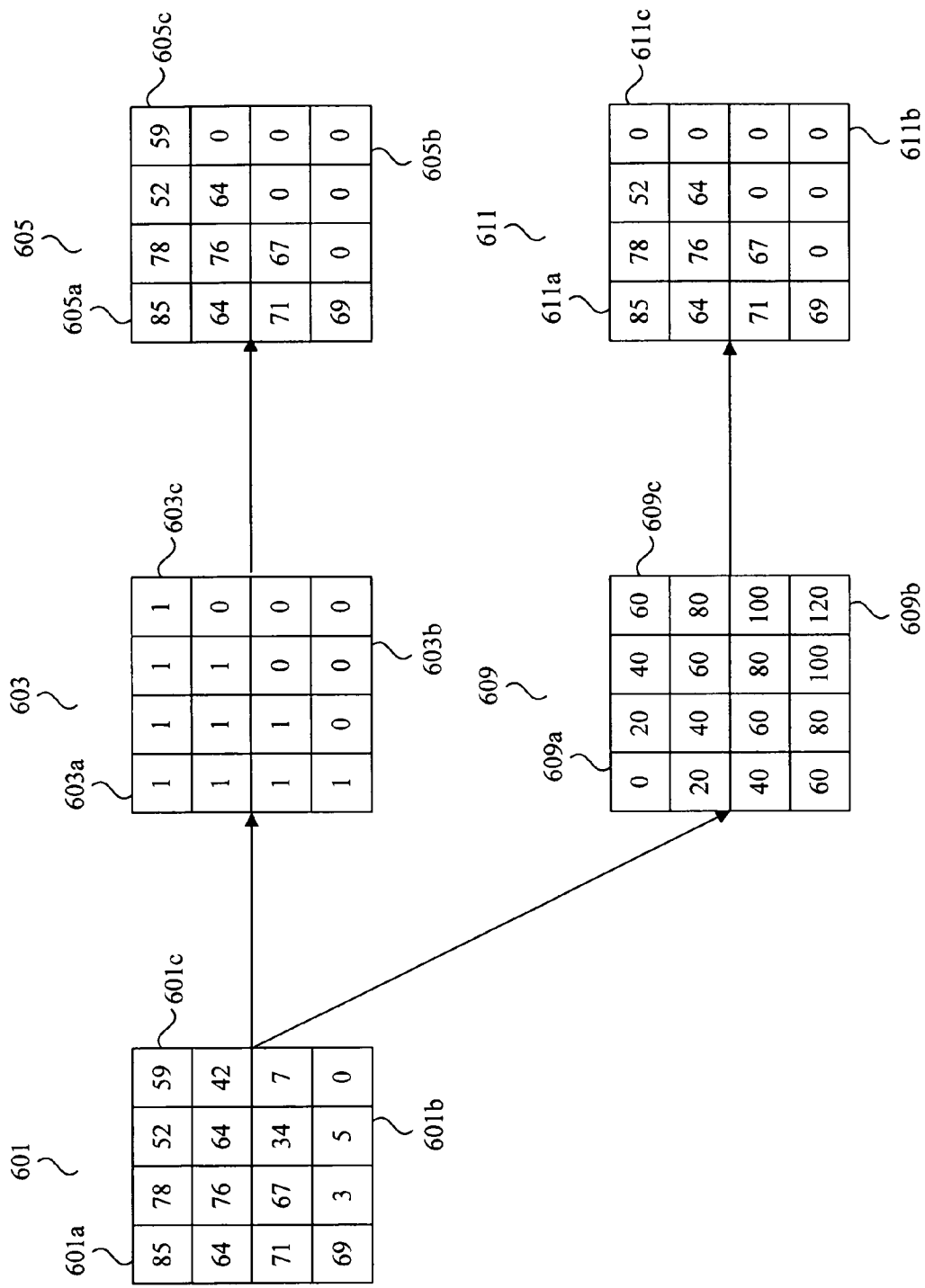
FIG. 6 is a diagrammatic representation of the application of a filter using ones and zeros and a filter using threshold values, according to specific embodiments.

FIG. 6 is a diagrammatic representation of the application of two different filters to a block of transform coefficients. Block 601 contains low-frequency coefficients 601a and high frequency coefficients 601b. Filter 603 uses ones and zeroes to filter the coefficients of block 601. Block 603 contains ones in portion 603a and zeroes in portion 603b. Applying filter 603 to transform coefficient block 601 yields block 605. Block 605 contains low-frequency coefficients 605a that correspond to low-frequency coefficients 601a. High frequency coefficients 605b are filtered because of the zeroes in portion 603b of filter block 603.

Filter block 609 uses threshold values to filter coefficients of block 601. Coefficients of block 601 exceeding the corresponding value in filter block 609 are preserved. Coefficients of block 601 that do not exceed the corresponding value in filter block 609 are dropped. For example, coefficient 601c in block 601 does not exceed the corresponding coefficient value 609c of 60, since 59 is less than 60. Consequently, the resulting block 611 has a 0 in value 611c. A filter 603 using ones and zeroes and filter 609 using threshold values can yield similarly processed blocks in 605 and 611. It should be noted however, that the resulting blocks 605 and 611 can be also quite different for different values.

Figure 7:
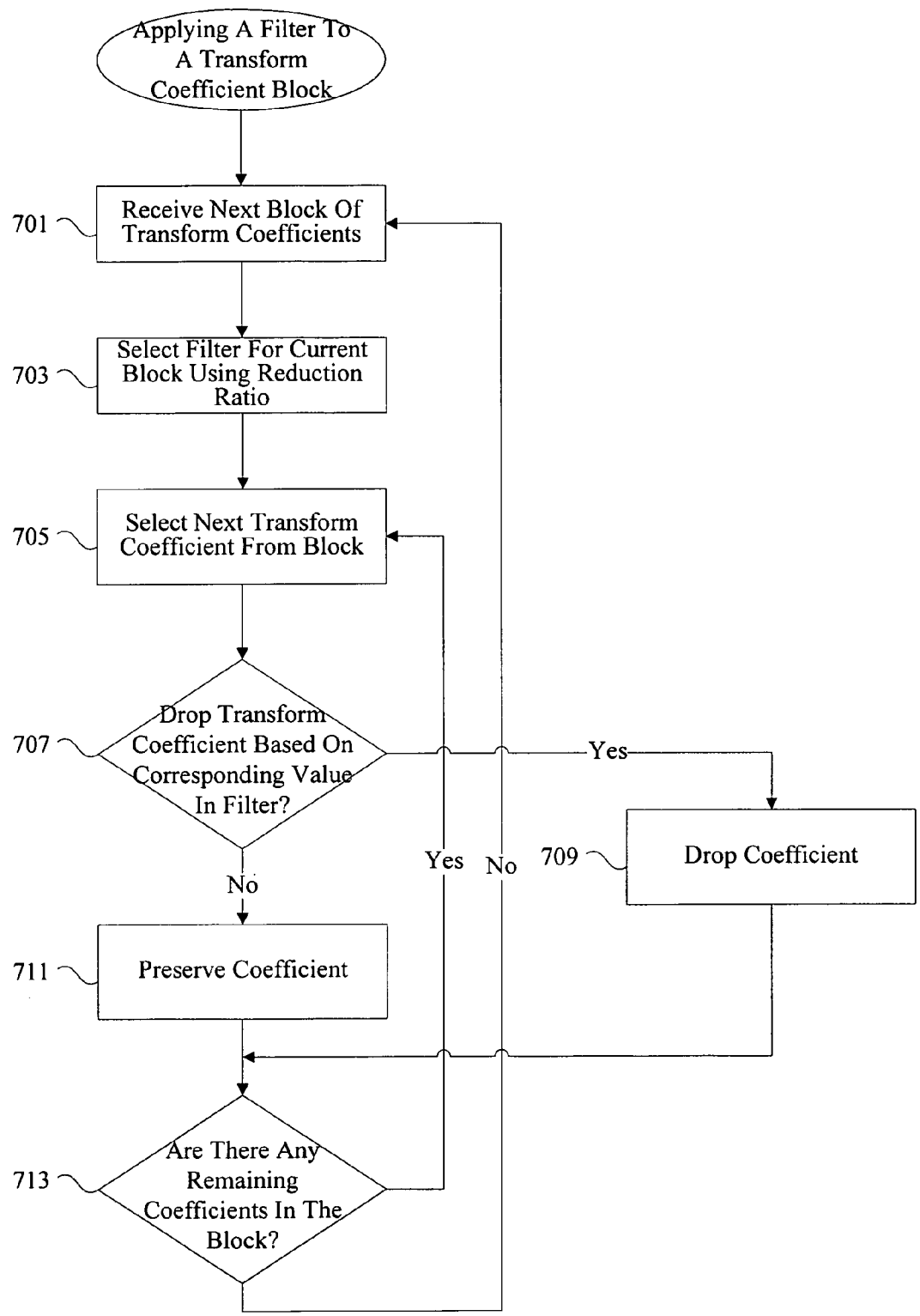
FIG. 7 is a process flow diagram showing techniques for applying a filter, according to specific embodiments, according to specific embodiments.

FIG. 7 is a process flow diagram describing a technique for using predetermined filters to select how transform coefficients are filtered. At 701, the next block of transform coefficients is received. At 703, a filter for the current block is identified. The filter selected can be one of those shown in FIG. 4 and FIG. 5. For example, to achieve a target reduction ratio of 50 percent, a filter can be selected at 703 that is similar to filter 403 of FIG. 4. Techniques for selecting a filter are described in U.S. patent application Ser. No. 09/867,966 by Wu et al., and titled Methods and Apparatus for Transform Coefficient Filtering, the entirety of which is incorporated by reference for all purposes. At 705, the next transform coefficient from the block is selected. It is determined at 707 whether to drop the transform coefficients based on selected filter. Using the filters of FIG. 4, if the selected transform coefficient corresponds to a one in the selected filter, the transform coefficients preserved at 711. If the selected transform coefficient corresponds to a zero from the selected filter, the transform coefficient is dropped at 709.

Applying a filter of FIG. 5, a determination is made at 705 as to whether the selected transform coefficient exceeds a corresponding value in the selected filter. If the transform coefficient value exceeds a corresponding value in the selected filter, the transform coefficient is dropped at 709. If the transform coefficient selected from the block at 705 does not exceed the corresponding value of the filter selected at 703, the transform coefficient is preserved at 711. As will be appreciated by one of skill in the art, the process flow can also be easily configured to drop coefficients when transform coefficients do not exceed the corresponding value in the selected filter. In other words, the threshold can either be the upper threshold or lower threshold for retaining a transform coefficient. At 713, it is determined whether any coefficients remain in the block. If coefficients remain, the next transform coefficient from the block is selected at 705. Otherwise, the next block of transform coefficients is received at 701. As noted above, the process of FIG. 7 can be implemented using hardware that takes advantage of parallel processing. Certain hardware embodiments may be configured to apply the filter to all the transform coefficients of a block simultaneously, such as in a vector or matrix operation.

Figure 8:
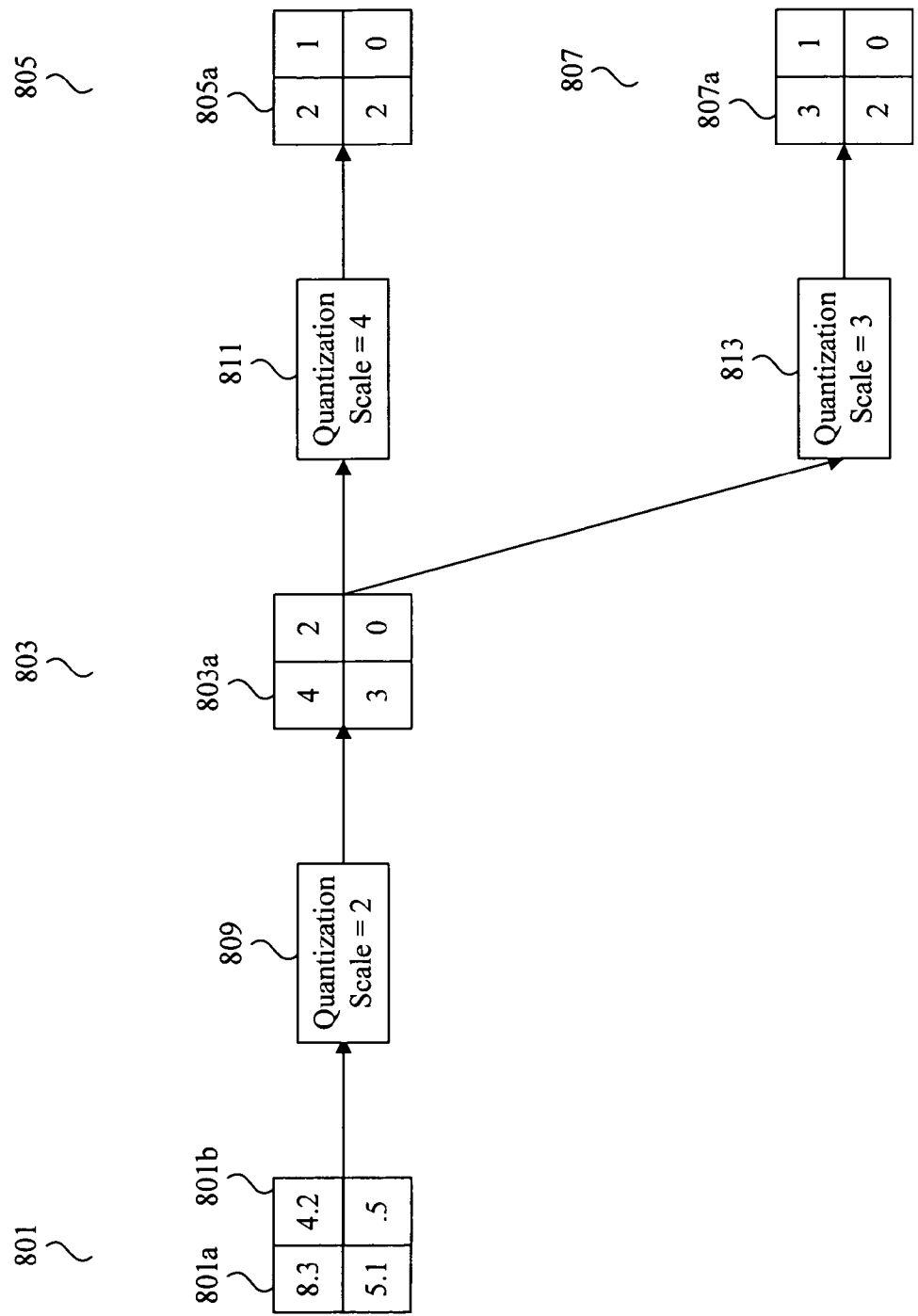
FIG. 8 is a diagrammatic representation of application of requantization, according to specific embodiments.

As noted above, filtering blocks of transform coefficients associated with input bits is one way of providing modified transform coefficients associated with rate reduced output bits. As will be appreciated by one of skill in the art, requantization is another way of altering transform coefficients. FIG. 8 is a diagrammatic representation showing requantization applied to a 2×2 block of transform coefficients. The 2×2 block of transform coefficients is used to provide an illustrative example. In MPEG-2, blocks of transform coefficients are typically 8×8 matrices. Requantization is a technique for applying a new quantization scale to a block of transform coefficients. Requantization can be used at requantization stage 113 shown in FIG. 1. Block 801 shows four transform coefficients 8.3, 4.2, 5.1, 0.5. At 809, transform coefficient block 801 is quantized using a quantization scale of two.

A quantization scale of two applied to transform coefficient block 801 yields block 803 containing values 4, 2, 3, 0. It should be noted that quantization may be applied to block 801 before the MPEG encoded bitstream is provided to a network 101 as shown in FIG. 1. Quantization is typically one of the steps used to MPEG encode a video bitstream. System 129 of FIG. 1 can be a system that receives the input bits associated with block 803. A new quantization scale can be applied to the transform coefficient block 803 to further reduce the size of the bitstream associated with transform coefficient block 803. In other words, a new quantization scale can be applied to the coefficient block 803 to rescale the MPEG encoded data. According to various embodiments, a new quantization scale of 4 is applied at 811 to the transform coefficient block 803. Since block 803 has a current quantization scale of two, applying a quantization scale of four means that the transform coefficients in block 803 are divided by 2 to yield the transform coefficients in block 805. It should be noted that the transform coefficients 2, 1, 2, 0 in block 805 are roughly equivalent to transform coefficients 8.3, 4.2, 5.1, 0.5 of block 801 divided by the quantization scale of 4.

The transform coefficients of block 805 now represent three levels, specifically 0, 1, and 2. By contrast, the transform coefficients of block 803 represent four levels, specifically 0, 2, 3, and 4. Similarly, the transform coefficients of block 801 represent four levels. As will be appreciated by one of skill in the art, transform coefficients representing fewer levels can more efficiently be variable length coded. Furthermore, higher quantization scales typically lead to lower numbers and more zeroes in the transform coefficient block. Both of these effects can provide more efficient variable length coding. That is, the number of output bits associated with transform coefficient block 805 will typically be less than the number of input bits associated with transform coefficient block 801 because of the higher quantization scale.

According to other embodiments, a new quantization scale of three is applied at 813 to block 803. Since block 803 already has a quantization scale of two, applying a quantization scale of three at 813 means that the transform coefficients in block 803 are divided by 1.5 or 3/2. The division of the transform coefficients of block 803 by 1.5 yields the transform coefficients of block 807. It should be noted that the transform coefficients in block 807 still represent the same number of levels as transform coefficients in block 803.

Figure 9:
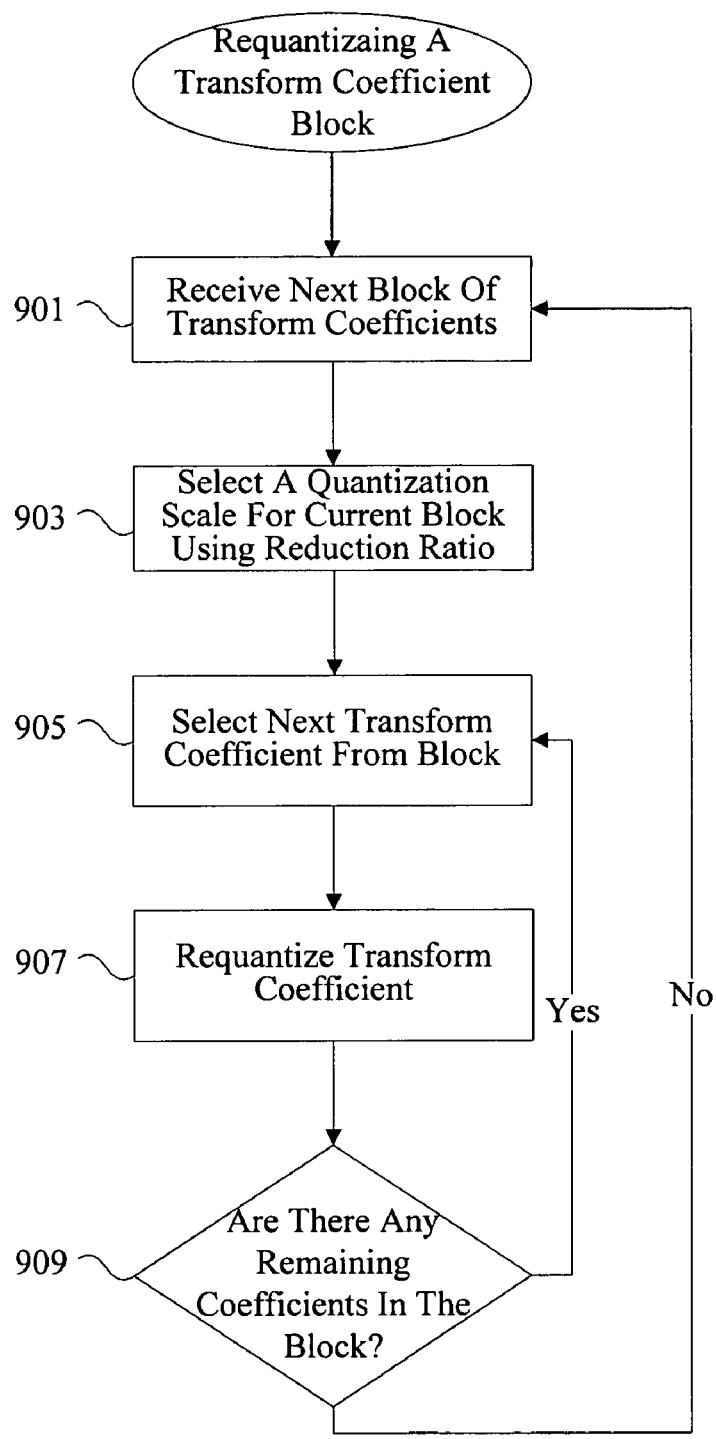
FIG. 9 is a process flow diagram showing techniques for applying requantization, according to specific embodiments.

FIG. 9 is a process flow diagram showing requantization of a transform coefficient block. At 901, the next block of transform coefficients is received. At 903, a quantization scale for the current block is selected using a reduction ratio. At 905, the next transform coefficient from the block is selected. The transform coefficient is then requantized at 907. It is determined at 909 whether there are any remaining coefficients of the block. If there are remaining coefficients, the next transform coefficient from the block is selected at 905. If there are no remaining coefficients in the block, the next block of transform coefficients is received at 901. It should be noted that although each transform coefficient is serially requantized in FIG. 9, various chip architectures allow parallel requantization of the transform coefficients. According to various embodiments, 64 transform coefficients of an 8×8 MPEG-2 block can be requantized in parallel.

Figure 10:
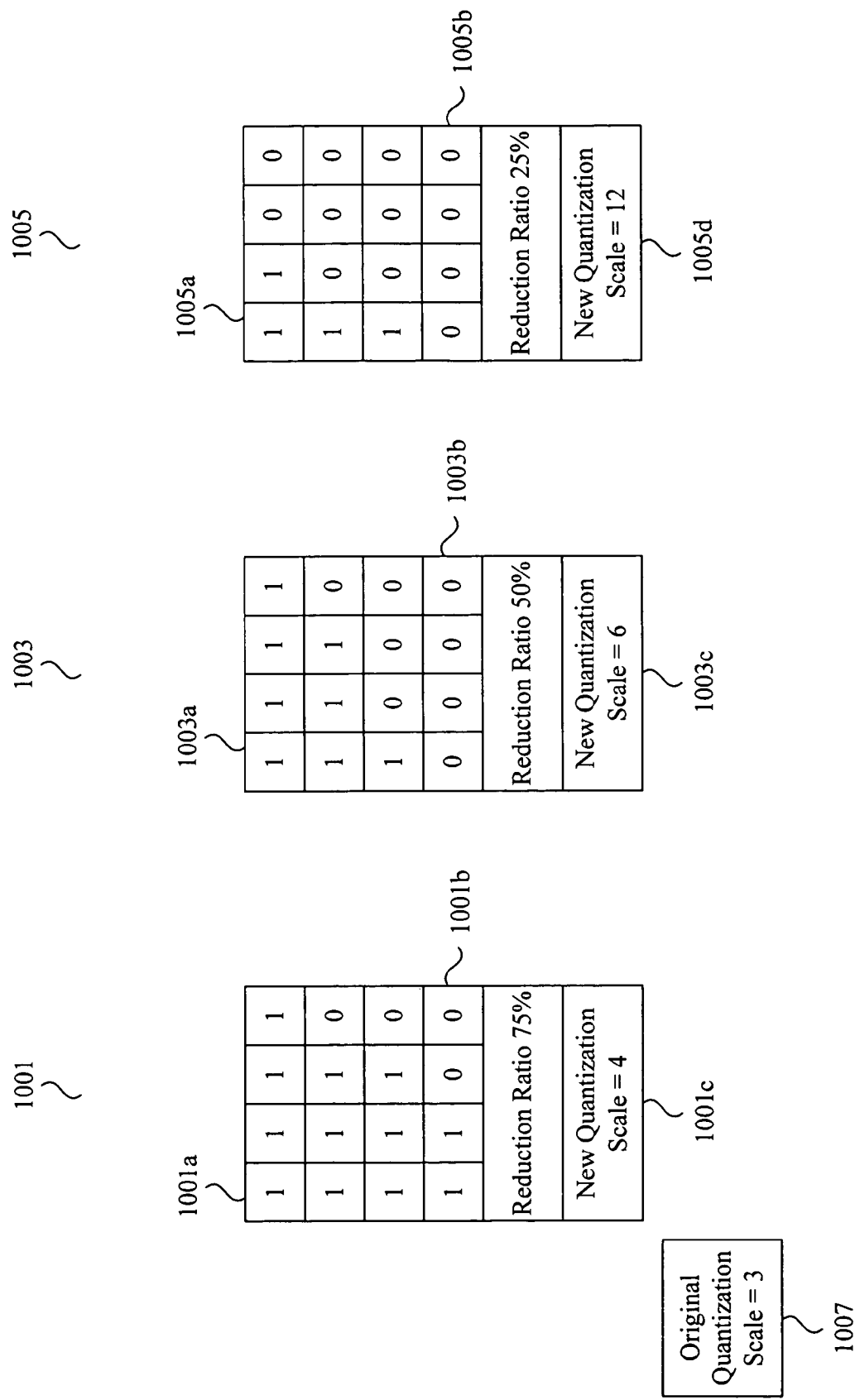
FIG. 10 is a diagrammatic representation of filters and requantization levels that can be selected based on a reduction ratio, according to specific embodiments.

As noted in process 903 in FIG. 9 and 703 in FIG. 7, a filter and a quantization scale for a current block can be selected using a reduction ratio. FIG. 10 is a diagrammatic representation of various filters and quantization scales that can be selected using particular reduction ratios. In other words, FIG. 10 provides filters and quantization scales that can be used to apply a reduction ratio to an input bitstream. FIG. 10 assumes the original quantization scale of a transform coefficient block is three, although filters and new quantization scales can be provided for transform coefficient blocks with a variety of original quantization scales. The quantization scale of MPEG transform coefficients is often contained in or associated with the MPEG bitstream. As will be understood by one of skill the art, a quantization scale contained in or associated with the MPEG bitstream can be updated to reflect the new quantization scale after requantization.

According to various embodiments, the reduction ratio is 75 percent. In other words, the output bitstream should use 75 percent of the bandwidth used by the input bitstream. Alternatively, the number of output bits should be 75 percent of the number of input bits. A reduction ratio of 75 percent can be used to select filter and quantization block 1001. Filter and quantization block 1001 comprises a filter configured to remove four high frequency coefficients in portion 1001b. Filter and quantization block 1001 also applies a new quantization scale of four. According to various embodiments, the new quantization scale can be calculated by dividing the original quantization scale of three by the reduction ratio of 75 percent. The original quantization scale of three divided by the reduction ratio of 75 percent yields the new quantization scale of four. Filter and quantization block 1003 can be identified in the same way. A new quantization scale of six can be determined by dividing the original quantization scale of three by the reduction ratio of 50 percent. The filter can be configured to filter half of the transform coefficients of a block.

With a reduction ratio of 25 percent, the filter can be configured to preserve only 25 percent of the transform coefficients. The new quantization scale of 12 can be calculated by dividing the original quantization scale of three by the reduction ratio of 25 percent.

It should be noted that although FIG. 10 provides 4×4 filters, filter of a wide variety of sizes and configurations can be provided. For example, 8×8 filters can be used for many transform coefficient blocks of an MPEG encoded bitstream. A one-dimensional filter as shown in FIG. 4 in FIG. 5 can also be used. Although the percentage of transform coefficients preserved by the filters in FIG. 10 is equivalent to the reduction ratio, it should be noted that the percentage of transform coefficients preserved does not have to be equivalent to the reduction ratio. As will be appreciated by one of skill in the art, a variety of filters using threshold values can also be used.

Figure 11:
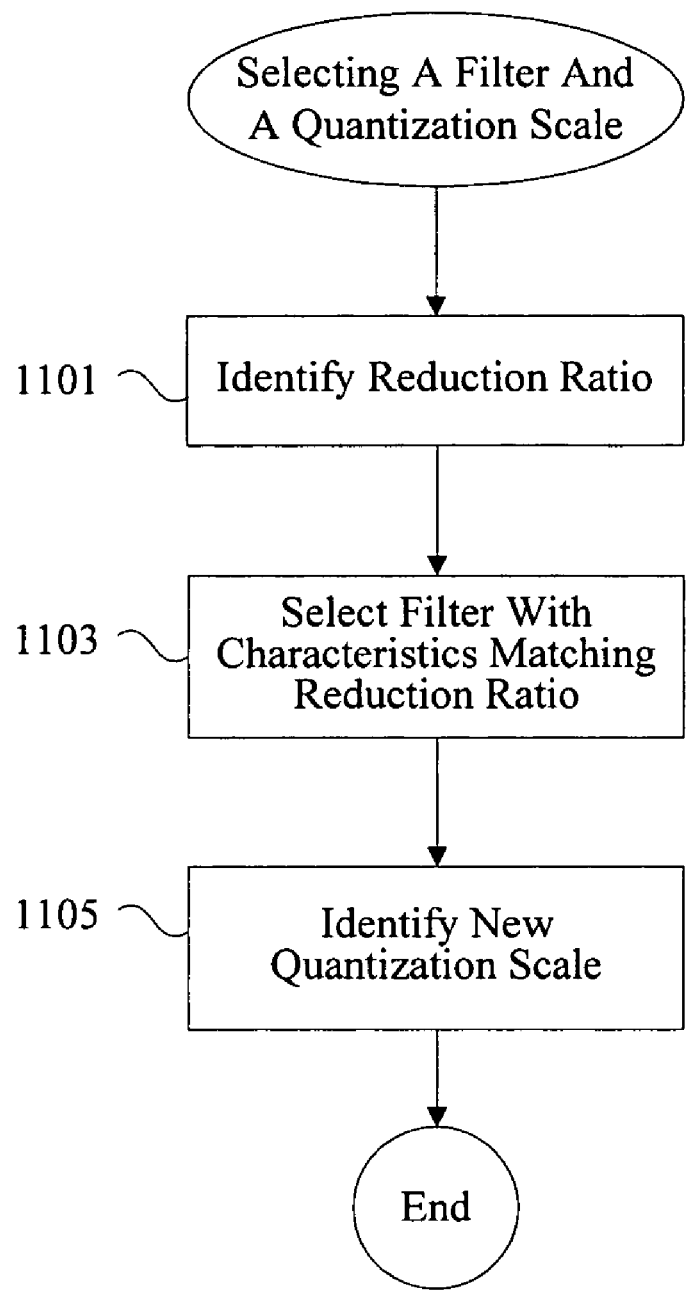
FIG. 11 is a process flow diagram showing techniques for selecting a filter and a requantization level using a reduction ratio.

FIG. 11 is a process flow diagram showing a technique for selecting a filter and a quantization scale. The techniques of FIG. 11 can be used in process 703 in FIG. 7 and process 903 in FIG. 9. At 1101, a reduction ratio is identified. At 1103, a filter is selected with characteristics matching the reduction ratio. The filter can be one of those shown in FIG. 10. At 1103, the new quantization scale is identified. As noted above, the new quantization scale can be calculated by dividing the original quantization scale by the reduction ratio. According to various embodiments, both filters and quantization scales can be used to applying a reduction ratio to and input bitstream. Filters and quantization scales can be used individually or in unison to rescale input bits.

More detail will not be provided on process 1101 in FIG. 11. Specifically, more detail will be provided on identifying a reduction ratio for a particular block. As noted above, and input bitstream can be video comprising a series of frames. In MPEG-2, each frame comprises a plurality of macroblocks. Each macroblock can be separated into blocks representing luminance and chrominance pixels of the macroblock. A target reduction ratio can be set for the video. The target reduction ratio generally refers to the desired size of the video divided by the current size of the video. If the video is currently 100 MB and the video needs to be reduced to 75 MB, the target reduction ratio would be 75 percent. According to one very simple embodiment, the target reduction ratio would be the reduction ratio for every block of transform coefficients in the frame. The reduction ratio of 75 percent can be used to select a filter and a new quantization scale such as that of block 1001 of FIG. 10.

Figure 12:
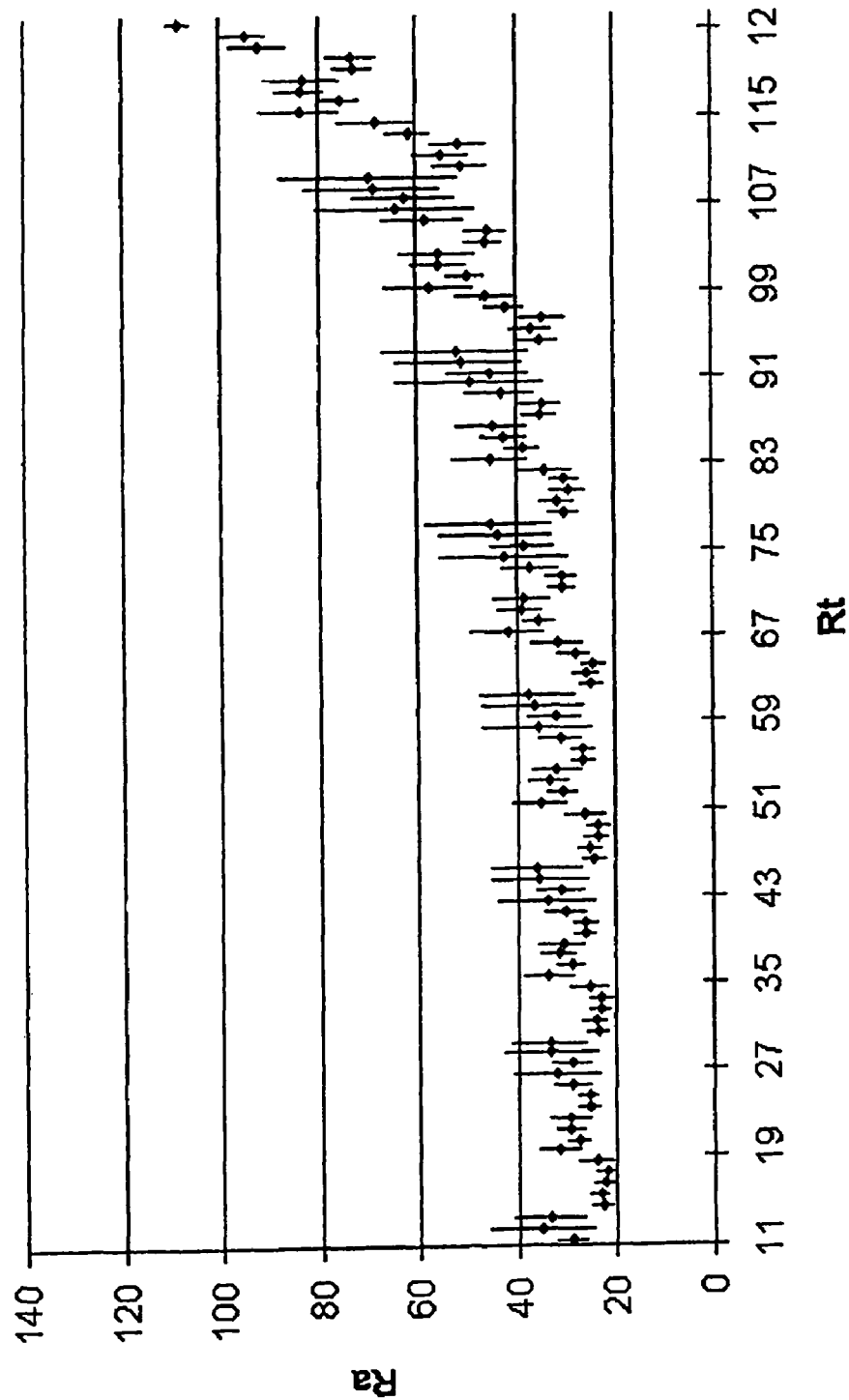
FIG. 12 is a graphical representation showing the actual achieved reduction ratio versus the target reduction ratio for each macroblock of a series of frames.

As will be appreciated by one of skill in the art, however, applying a filter and a new quantization scale shown in block 1001 to a block of transform coefficients does not necessarily result in an actual reduction ratio of 75 percent. FIG. 12 shows the actual achieved reduction ratio vs. the target reduction ratio for each macroblock of a series of frames. The mean and the standard deviation of the resulting actual reduction ratio are provided. The values of the horizontal and vertical axes should be divided by 128 to show the reduction ratio. It should be noted that a target reduction ratio of 75 percent leads to a relatively wide range of actual reduction ratios. Consequently, the present invention provides techniques for adjusting the reduction ratio during the rescaling of a particular input bitstream.

The present invention contemplates using feedback to allow rescaling of an input bitstream to meet a target reduction ratio effectively. According to preferred embodiments, a reduction ratio is updated after each macroblock is processed. In other words, the blocks representing luminance and chrominance pixels associated with an MPEG-2 macroblock can be processed using the same reduction ratio. After the macroblock is processed however, the reduction ratio is updated based on be number of output bits associated with the altered transform coefficients of the processed macroblock and the number of input bits associated with the transform coefficients of the original macroblock. Running tallies of input bits associated transform coefficients of original macroblocks and output bits associated with altered transform coefficients of processed macroblocks can also be maintained to provide more sophisticated feedback information for updating the reduction ratio. A variety of factors can be used to update the reduction ratio. Generally, factors that can be used to update the reduction ratio are referred to as rate control information.

According to various embodiments, rate control information can be updated on a per block basis. In other words, instead of waiting for the processing of multiple blocks associated with a macroblock, the reduction ratio can be updated as soon as a single block of transform coefficients is altered. It still other embodiments, rate control information can be updated after several macroblocks are processed. The following equations detail the calculation of a reduction ratio performed on a per macroblock basis.

$$R_t = B_t/B_i \quad \text{(Equation 1)}$$

where $R_t$ is the target reduction ratio for the frame;

$B_i$ is the total input bit size of the frame; and $B_t$ is the target output bit size of the frame.

Equation 1 can be used to calculate the target reduction ratio. According to preferred embodiments, the target reduction ratio varies on a per frame basis. The target reduction ratio for I-frames is generally higher than the target reduction ratio for B-frames and P-frames. As noted above, I-frames are independent frames comprising the actual image information. B-frames and P-frames are dependent frames that are associated with motion vectors and differential information.

$$R_u = (R_t b_c - (b_o - R_t b_i))/b_c \quad \text{(Equation 2)}$$

where $R_u$ is the reduction ratio for the current macroblock;

$R_t$ is the target reduction ratio for the frame;

$b_c$ is the number of bits for the current macroblock;

$b_o$ is the total number of bits output for the prior macroblocks in the frame; and $b_i$ is the total number of bits input for the prior macroblocks in the frame.

Equation 2 provides a simple technique for calculating an actual reduction ratio that addresses deviations from the target reduction ratio. The value $b_i$ is a running tally of the total number of input bits associated with transform coefficients of processed macroblocks in the frame. The value $b_o$ is a running tally of the total number of output bits associated with altered transform coefficients of processed data blocks in the frame. If the reduction ratio is being calculated for the first macroblock of the frame, both $b_i$ and $b_o$ are zero. The value $b_c$ is the number of bits for the current macroblock. The $(b_o - R_t b_i)$ term indicates by how many bits cumulatively the target reduction ratio is being missed. For example, if the reduction ratio is 75 percent and the running tally of output bits is 80 and the running tally of input bits is 100, the term would indicate that the target reduction ratio is being missed by five bits. Equation 1 attempts to compensate for the missed by increasing or decrease in the reduction ratio for the next macroblock. However, fully compensating for the miss in the next macroblock may cause significant jittering of the reduction ratio between macroblocks. It is also likely that the target reduction ratio can not be achieved.

$$R_u = (R_t B_i - b_o)/(B_i - b_i)$$ (Equation 3)

where $R_u$ is the reduction ratio for the current macroblock;
$R_t$ is the target reduction ratio for the frame;
$B_i$ is the number of input bits for the frame;
$b_o$ is the total number of bits output for the prior macroblocks in the frame; and
$b_i$ is the total number of bits input for the prior macroblocks in the frame.

Equation 3 allows compensation for the miss to be disbursed across all remaining macroblocks. For example, where the number of input bits for the frame is 1000, the running tally of output bits for the prior macroblocks is 80, the running tally of the input bits for the prior macroblocks is 100, and the target reduction ratio for the frame is 60 percent, the updated reduction ratio would be (1000*60%−80)/(1000−100)=520/900=57.78%. Equation 3 allows more gradual compensation for a target reduction ratio miss. Equation 3 provides relatively low variations in reduction ratios from macroblock to macroblock that jittering of the reduction ratio still occurs during the later macroblocks of the frame. Again, the target reduction ratio may be missed.

$$R_u = (R_t(b_i + W) - b_o)/W$$ (Equation 4)

where

W is a constant representing a predetermined number of bits;
$R_u$ is the reduction ratio for the current macroblock;
$R_t$ is the target reduction ratio for the frame;
$b_o$ is the total number of bits output for the prior macroblocks in the frame; and
$b_i$ is the total number of bits input for the prior macroblocks in the frame.

Equation 4 introduces a spreading factor W. the spreading factor represents a next group of bits. According to various embodiments, the spreading factor is ¼ or ⅛ of $B_i$ or the total input bits of the frame. The spreading factor reduces uttering while increasing the probability that meeting the target reduction ratio. For example, where W is 25% of 1000 bits or 250, $b_i$ is 100, $b_o$ is 80, and $R_t$ is 60%, the updated reduction ratio would be (60% (100+250)−80)/250 or 52%. According to various embodiments, where W decreases, the reduction ratio increases. Similarly, where W increases, the reduction ratio decreases. The spreading factor reduces the likelihood of jitter during the processing of later macroblocks in a frame. However, it is still possible that he target reduction ratio will be missed.

$$R_u = (R_t(b_i + W) - b_o + \alpha(R_t b_i - b_o))/W$$ (Equation 5)

$$= R_t + ((1 + \alpha)(R_t b_i - b_o))/W$$ (Equation 6)

where

α is a convergence factor;
$R_u$ is the reduction ratio for the current macroblock;
$R_t$ is the target reduction ratio for the frame;
W is a constant representing a predetermined number of bits;
$b_o$ is the total number of bits output for the prior macroblocks in the frame; and
$b_i$ is the total number of bits input for the prior macroblocks in the frame.

Equations 5 and 6 introduce a convergence factor. The convergence factor can be used to force overshooting of the target. For example, if the target reduction ratio is 60 percent, W is 250 bits, $b_i$ is 100 bits, $b_o$ is 80 bits, and the convergence factor is ½, the updated reduction ratio would be 60%+((1+ ½)(60%*100−80))/250=48%. It should be noted that the convergence factor is used to overshoot the target reduction ratio. According to various embodiments, D. convergence factor is 1 or ½.

$$R_u = R_t + ((1+\alpha)(R_t b_i - b_o))/W + f_d$$ (Equation 7)

where $f_d$ is a per frame offset value;
α is a convergence factor;
$R_u$ is the reduction ratio for the current macroblock;
$R_t$ is the target reduction ratio for the frame;
W is a constant representing a predetermined number of bits;
$b_o$ is the total number of bits output for the prior macroblocks in the frame; and
$b_i$ is the total number of bits input for the prior macroblocks in the frame.

Equation 7 introduces a compensation factor. The compensation factor allows calculation of filter is and quantization scales as shown in FIG. 10 to be rough estimates. After the filter and quantization scales as shown in FIG. 10 are applied to a particular frame type, and a compensation factor can be used to increase the accuracy of the reduction ratio calculation. A compensation factor is calculated using a prior compensation factor for the same frame type. For example, compensation factors are tracked for I-frames, B-frames, and P-frames. A compensation factor is adapted to both past performance as well as picture type as shown in Equation 8.

$$f_d = f_d' + (R_t - B_o/B_i)$$ (Equation 8)

where $f_d'$ is a previous offset for the same frame type.
$R_t$ is the target reduction ratio for the frame;
$B_i$ is the total input bit size of the frame; and
$B_o$ is the total output size of the frame.

The techniques of the present invention for determining updated reduction ratios can be used in a variety of resealing systems as well as encoding systems. The techniques are not limited to update a great reduction ratios on a per macroblock basis that can be applied to 18 other unit of data. Using the techniques of the present invention, variation in reduction ratios between macroblocks is reduced while achieving target reduction ratios.

The present invention for altering transform coefficients to provide rate reduction in a bitstream can be implemented in various network systems. In various embodiments, this is implemented in the headend of a high bandwidth networks such as a cable network or a satellite network. In the context of a cable network, the invention may be implemented in a standalone system, such as Cisco 6920 RateMux® available from Cisco Systems, Inc, or in a line card of a cable network headend such as the Cisco UBR 7200 also available from Cisco Systems, Inc.

Figure 13:
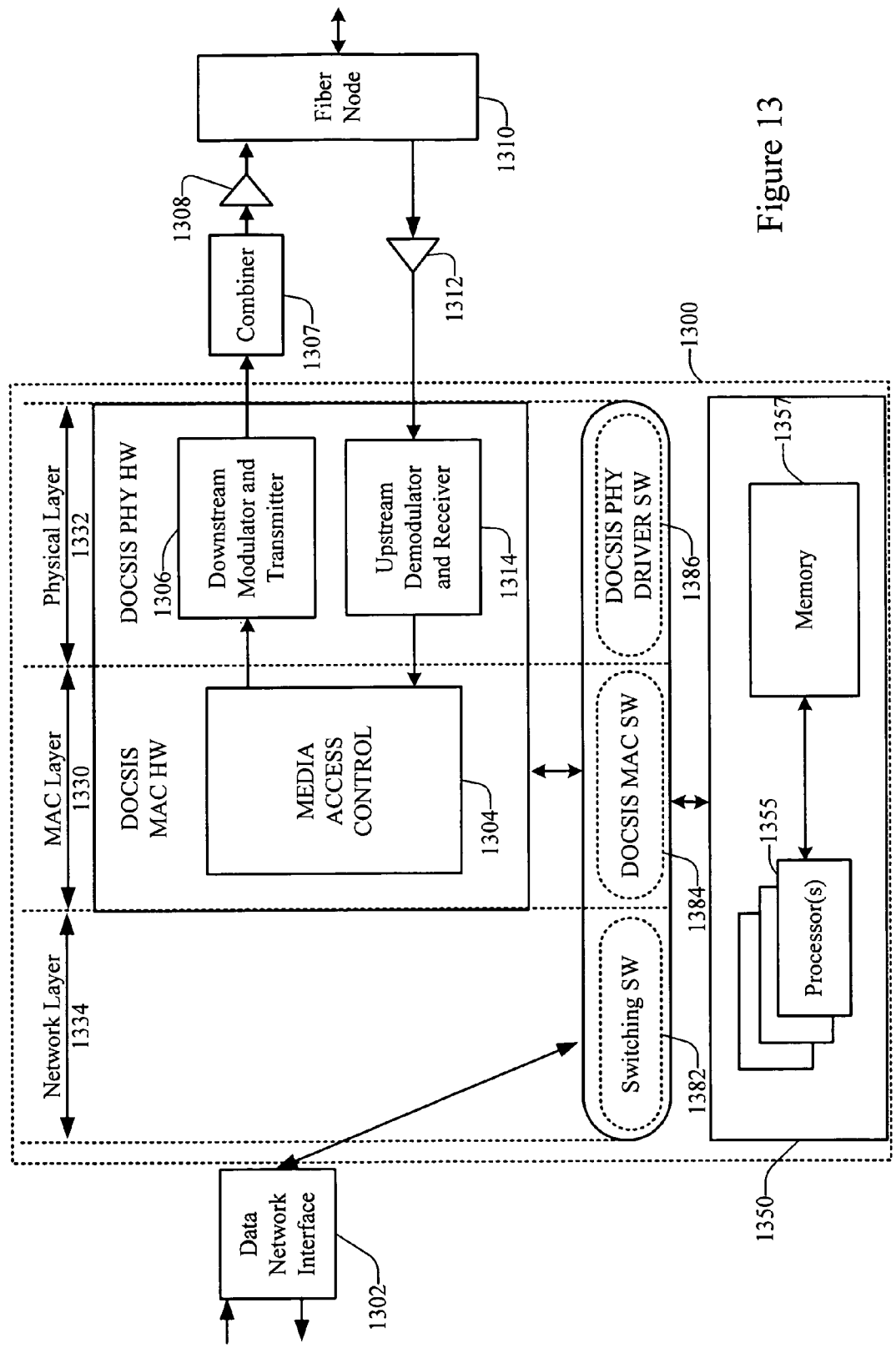
FIG. 13 is a diagrammatic representation of a system that can be used to implement the techniques of the present invention.

FIG. 13 depicts the basic components of a cable modem headend that can be used to implement the present invention, according to specific embodiments. Although the techniques of the present invention can be integrated into a cable modem headend, the present invention can also be used in a standalone system. FIG. 13 shows an implementation using the cable modem headend.

A Data Network Interface 1302 is an interface component between an external data source and the cable system. External data sources transmit data to data network interface 1302 via optical fiber, microwave link, satellite link, or through various other media. Also as mentioned above, a Media Access Control Block (MAC Block) 1304 receives data packets from a Data Network Interface 1302 and encapsulates them with a MAC header.

In a specific embodiment as shown in FIG. 13, CMTS provides functions on three network layers including a physical layer 1332, a Media Access Control (MAC) layer 1330, and a network layer 1334. Generally, the physical layer is responsible for receiving and transmitting RF signals on the cable plant. Hardware portions of the physical layer include a downstream modulator and transmitter 1306 and an upstream demodulator and receiver 1314. The physical layer also includes software 1386 for driving the hardware components of the physical layer.

Once an information packet is demodulated by the demodulator/receiver 1314, it is then passed to MAC layer 1330. A primary purpose of MAC layer 1330 is to encapsulate and decapsulate packets within a MAC header, preferably according to the above-mentioned DOCSIS standard for transmission of data or other information.

MAC layer 1330 includes a MAC hardware portion 1304 and a MAC software portion 1384, which function together to encapsulate information packets with the appropriate MAC address of the cable modem(s) on the system. After the upstream information has been processed by MAC layer 1330, it is then passed to network layer 1334. Network layer 1334 includes switching software 1382 for causing the upstream information packet to be switched to an appropriate data network interface on data network interface 1302.

When a packet is received at the data network interface 1302 from an external source, the switching software within network layer 1334 passes the packet to MAC layer 1330. MAC block 1304 transmits information via a one-way communication medium to downstream modulator and transmitter 1306. Downstream modulator and transmitter 1306 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 1307. Converter 1308 converts the modulated RF electrical signals to optical signals that can be received and transmitted by a Fiber Node 1310 to the cable modem hub.

It is to be noted that alternate embodiments of the CMTS (not shown) may not include network layer 1334. In such embodiments, a CMTS device may include only a physical layer and a MAC layer, which are responsible for modifying a packet according to the appropriate standard for transmission of information over a cable modem network. The network layer 1334 of these alternate embodiments of CMTS devices may be included, for example, as part of a conventional router for a packet-switched network.

In a specific embodiment, the network layer of the CMTS is configured as a cable line card coupled to a standard router that includes the physical layer 1332 and MAC layer 1330. The techniques of the present invention including a filtering stage and rate control stage shown in FIG. 1 can be implemented on a line card. Using this type of configuration, the CMTS is able to send and/or receive IP packets to and from the data network interface 1302 using switching software block 1382. The data network interface 1302 is an interface component between external data sources and the cable system. The external data sources transmit data to the data network interface 1302 via, for example, optical fiber, microwave link, satellite link, or through various media. The data network interface includes hardware and software for interfacing to various networks such as, for example, Ethernet, ATM, frame relay, etc.

As shown in FIG. 13, the CMTS includes a hardware block 1350 including one or more processors 1355 and memory 1357. These hardware components interact with software and other hardware portions of the various layers within the CMTS. Memory 1357 may include, for example, I/O memory (e.g. buffers), program memory, shared memory, etc. Hardware block 1350 may physically reside with the other CMTS components.

In one embodiment, the software entities 1382, 1384, and 1386 are implemented as part of a network operating system running on hardware 1350. Further, the provisions of this invention for providing quality of service for multicast streams are preferably implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the techniques for resealing data can be implemented a variety of systems including a router, a line card of a CMTS, or a generic computer system. In addition and as mentioned above, the invention may be implemented in both differential and single-ended configurations. Therefore, the scope of the invention should be determined with reference to the appended claims.

What is claimed is:

1. A device for altering blocks of transform coefficients associated with input bits to provide modified blocks of transform coefficients associated with output bits, the device comprising:
    an input interface operable to receive a first block of transform coefficients associated with the input bits and a second block of transform coefficients associated with the input bits;
    processing circuitry operable to alter the first block of transform coefficients by using a reduction ratio to generate a first block of modified transform coefficients and generate a first updated reduction ratio, wherein the first updated reduction ratio is calculated using a convergence factor associated with overshoot to allow for faster convergence;
wherein processing circuitry is further operable to alter the second block of transform coefficients to generate a second block of modified transform coefficients using the first updated reduction ratio.

2. The device of claim 1, wherein the input interface is operable to receive the first block of transform coefficients by performing variable length decoding on the input bits.

3. The device of claim 1, wherein the input interface is operable to receive the first block of transform coefficients by acquiring the transform coefficients decoded from a file.

4. The device of claim 1, wherein the input interface is operable to receive the first block of transform coefficients by performing a DCT operation on video data.

5. The device of claim 1, wherein the input interface is operable to receive the first block of transform coefficients by performing a DCT operation on audio data.

6. The device of claim 1, wherein the first block of transform coefficients is a block of DCT coefficients.

7. The device of claim 1, wherein the input bits identify a frame of MPEG encoded video.

8. The device of claim 7, wherein the frame is an I-frame type, B-frame type, or a P-frame type.

9. The device of claim 8, wherein the reduction ratio is determined using information associated with altering MPEG frames of the same type.

10. The device of claim 1, wherein the first updated reduction ratio is generated using information associated with altering the first block of transform coefficients.

11. The device of claim 1, wherein altering the first block of transform coefficients comprises filtering transform coefficients.

12. The device of claim 1, wherein altering the first block of transform coefficients comprises requantizing transform coefficients.

13. A method of altering blocks of transform coefficients associated with input bits to provide modified blocks of transform coefficients associated with output bits, the method comprising:
identifying a first block of transform coefficients associated with the input bits;
altering the first block of transform coefficients by using a reduction ratio to generate a first block of modified transform coefficients;
generating a first updated reduction ratio, wherein the first updated reduction ratio is calculated using a convergence factor associated with overshoot to allow for faster convergence;
identifying a second block of transform coefficients associated with the input bits; and
altering the second block of transform coefficients to generate a second block of modified transform coefficients using the first updated reduction ratio.

14. The method of claim 13, wherein identifying the first block of transform coefficients comprises performing variable length decoding on the input bits.

15. The method of claim 13, wherein identifying the first block of transform coefficients comprises acquiring the transform coefficients decoded from a file.

16. The method of claim 13, wherein identifying the first block of transform coefficients comprises performing a DCT operation on video data.

17. The method of claim 13, wherein identifying the first block of transform coefficients comprises performing a DCT operation on audio data.

18. The method of claim 13, wherein the first block of transform coefficients is a block of DCT coefficients.

19. The method of claim 13, wherein the input bits identify a frame of MPEG encoded video.

20. The method of claim 19, wherein the frame is an I-frame type, B-frame type, or a P-frame type.

21. The method of claim 20, wherein the reduction ratio is determined using information associated with altering MPEG frames of the same type.

22. The method of claim 13, wherein the first updated reduction ratio is generated using information associated with altering the first block of transform coefficients.

23. The method of claim 13, wherein altering the first block of transform coefficients comprises filtering transform coefficients.

24. The method of claim 13, wherein altering the first block of transform coefficients comprises requantizing transform coefficients.

25. The method of claim 13 further comprising:
generating a second updated reduction ratio;
identifying a third block of transform coefficients associated with the input bits; and
altering the third block of transform coefficients to generate a third block of modified transform coefficients using the second updated reduction ratio, wherein altering the third block of transform coefficients allows the attainment of a target reduction ratio.

26. The method of claim 25, wherein the first updated reduction ratio is calculated to achieve the target reduction ratio after the third block.

27. The method of claim 25, wherein the first updated reduction ratio is calculated to achieve the target reduction ratio after the final block associated with the input bits.

28. The method of claim 25, wherein the first updated reduction ratio is calculated to achieve the target reduction ratio after a set number of bits.

29. The method of claim 25, wherein the first updated reduction ratio is calculated using a compensation factor, the compensation factor correcting non-linearity between the updated reduction ratio and the actual achieved reduction ratio.

30. The method of claim 29, wherein the compensation factor is determined using the reduction ratio and the picture type.

31. An apparatus for altering blocks of transform coefficients associated with input bits to provide modified blocks of transform coefficients associated with output bits, the computer readable medium comprising:
means for identifying a first block of transform coefficients associated with the input bits;
means for altering the first block of transform coefficients by using a reduction ratio to generate a first block of modified transform coefficients;
means for generating an updated reduction ratio, wherein the first updated reduction ratio is calculated using a convergence factor associated with overshoot to allow for faster convergence;
means for identifying a second block of transform coefficients associated with the input bits; and
means for altering the second block of transform coefficients to generate a second block of modified transform coefficients using the updated reduction ratio.

32. The apparatus of claim 31, wherein identifying the first block of transform coefficients comprises performing variable length decoding on the input bits.

33. The apparatus of claim 31, wherein identifying the first block of transform coefficients comprises acquiring the transform coefficients decoded from a file.

34. The apparatus of claim 31, wherein identifying the first block of transform coefficients comprises performing a DCT operation on video data.

35. The apparatus of claim 31, wherein identifying the first block of transform coefficients comprises performing a DCT operation on audio data.

36. The apparatus of claim 31, wherein the first block of transform coefficients is a block of DCT coefficients.

37. The apparatus of claim 31, wherein the input bits identify a frame of MPEG encoded video.

38. The apparatus of claim 31, wherein generating an updated reduction ratio comprises using a spreading factor.

39. The apparatus of claim 31, wherein generating an updated reduction ratio comprises using a convergence factor.

40. The apparatus of claim 31, wherein generating an updated reduction ratio comprises using a compensation factor.

* * * * *